(12) United States Patent
Horinek

(10) Patent No.: US 10,694,685 B2
(45) Date of Patent: Jun. 30, 2020

(54) ACTIVE POLYMER MATERIAL FOR AGRICULTURAL USE

(71) Applicant: HGXE Holdings, LLC, Santa Monica, CA (US)

(72) Inventor: David Horinek, Santa Monica, CA (US)

(73) Assignee: HGXE Holdings, LLC, Santa Monica, CA (US)

( * ) Notice: Subject to any disclaimer, the term of this patent is extended or adjusted under 35 U.S.C. 154(b) by 270 days.

(21) Appl. No.: 14/860,082

(22) Filed: Sep. 21, 2015

(65) Prior Publication Data

US 2016/0081281 A1 Mar. 24, 2016

Related U.S. Application Data

(60) Provisional application No. 62/054,158, filed on Sep. 23, 2014.

(51) Int. Cl.
| | | |
|---|---|---|
| *A01G 9/14* | (2006.01) | |
| *A01G 22/00* | (2018.01) | |
| *C08K 3/36* | (2006.01) | |
| *C08K 3/22* | (2006.01) | |
| *C08K 3/14* | (2006.01) | |
| *A01G 13/02* | (2006.01) | |

(52) U.S. Cl.
CPC ........... *A01G 22/00* (2018.02); *A01G 9/1438* (2013.01); *A01G 13/0256* (2013.01); *C08K 3/14* (2013.01); *C08K 3/22* (2013.01); *C08K 3/36* (2013.01); *C08K 2003/2227* (2013.01); *C08K 2003/2241* (2013.01); *Y02A 40/252* (2018.01)

(58) Field of Classification Search
CPC ..... A01G 9/02; A01G 9/10; A01G 2009/1053
See application file for complete search history.

(56) References Cited

U.S. PATENT DOCUMENTS

| | | | | |
|---|---|---|---|---|
| 3,590,528 | A | * 7/1971 | Shepherd | ........... A01G 13/0275 |
| | | | | 260/DIG. 43 |
| 4,741,909 | A | * 5/1988 | Guthrie | .............. A01G 13/0237 |
| | | | | 229/164.1 |
| 5,138,792 | A | 8/1992 | Allingham | |
| 5,532,298 | A | 7/1996 | Monroe et al. | |
| 5,649,495 | A | 7/1997 | Salestrom | |
| 5,868,087 | A | 2/1999 | Salestrom | |
| 5,879,695 | A | 3/1999 | Bastiaansen et al. | |

(Continued)

FOREIGN PATENT DOCUMENTS

| CN | 103224660 | 7/2013 |
|---|---|---|
| EP | 0579835 | 1/1994 |

(Continued)

OTHER PUBLICATIONS

Extended European Search Report issued by the European Patent Office for Application No. 1584414.0, dated May 8, 2018, 8 pages.

(Continued)

*Primary Examiner* — Kristen C Hayes
(74) *Attorney, Agent, or Firm* — Cooley LLP

(57) ABSTRACT

The present application teaches compositions and methods of using active polymer materials to manipulate solar radiation to improve or otherwise alter plant growth, development, health and/or production.

13 Claims, 14 Drawing Sheets

(56) References Cited

U.S. PATENT DOCUMENTS

| | | | |
|---|---|---|---|
| 5,958,294 | A | 9/1999 | Anissimov et al. |
| 5,998,085 | A | 12/1999 | Isberg et al. |
| 6,041,546 | A * | 3/2000 | Baranova ................. A01G 9/02 47/64 |
| 6,061,957 | A | 5/2000 | Takashima |
| 6,339,898 | B1 * | 1/2002 | Toye ...................... A01G 7/045 47/9 |
| 6,560,923 | B1 * | 5/2003 | Kamei ................. A01G 31/001 47/64 |
| 6,601,338 | B1 | 8/2003 | Peled et al. |
| 6,615,539 | B1 * | 9/2003 | Obonai ................. A01G 24/35 47/62 N |
| 7,074,499 | B2 | 7/2006 | Schnurer et al. |
| 7,247,311 | B2 | 7/2007 | Stein et al. |
| 7,342,058 | B2 * | 3/2008 | Peppmoller ............. C05D 9/00 524/13 |
| 7,459,501 | B2 | 12/2008 | Doane et al. |
| 7,683,982 | B2 | 3/2010 | Cho |
| 8,017,863 | B2 | 9/2011 | Forrest et al. |
| 8,142,804 | B2 | 3/2012 | Barazani |
| 8,143,333 | B2 * | 3/2012 | Peppmoller ............. C05D 9/00 524/13 |
| 8,898,955 | B2 * | 12/2014 | Akay ...................... A01H 3/00 47/59 S |
| 2005/0268544 | A1 | 12/2005 | Maffei |
| 2008/0311392 | A1 | 12/2008 | Tsu |
| 2011/0308154 | A1 * | 12/2011 | Akay ...................... A01H 3/00 47/66.7 |
| 2013/0097922 | A1 * | 4/2013 | Lempidakis ......... A01G 9/1438 47/17 |
| 2014/0274706 | A1 | 9/2014 | Hyde et al. |
| 2014/0331555 | A1 * | 11/2014 | Nonomura ............. A01G 22/00 47/65.5 |
| 2016/0353677 | A1 * | 12/2016 | Toye ........................ A01G 9/22 |
| 2018/0213730 | A1 * | 8/2018 | Tambay ................ C09D 101/18 |
| 2018/0310490 | A1 * | 11/2018 | Du ........................... B29C 48/92 |
| 2018/0371316 | A1 * | 12/2018 | Backfolk ............... C09K 17/52 |
| 2019/0284471 | A1 * | 9/2019 | Gu ........................ A01G 9/1438 |

FOREIGN PATENT DOCUMENTS

| | | |
|---|---|---|
| EP | 0964042 A1 | 12/1999 |
| EP | 1859674 A1 | 11/2007 |
| FR | 3000427 A1 | 7/2014 |
| KR | 10-2009-0085941 A | 8/2009 |
| WO | WO-2007-074899 A1 | 7/2007 |

OTHER PUBLICATIONS

Al-Helal, I. M. et. al. "Measuring and Evaluating Solar Radiative Properties of Plastic Shading Nets", *Solar Energy Materials & Solar Cells*, 2011, 95, p. 677-683.

Folta et al., "Light as a Growth Regulator: Controlling Plant Biology with Narrow-bandwidth Solid-state Lighting Systems", *HortScience* 2008, vol. 43, No. 7, p. 1951-1956.

Ghosal et al, "Modeling and experimental validation of a greenhouse with evaporative cooling by moving water film over external shade cloth", *Energy and Buildings*, 2003, vol. 35, No. 8, p. 843-850.

Shibayev, P. et al. "The Effect of Circularly Polarized Light on the Growth of Plants", *International Journal of Botany*, 2011, vol. 7, No. 1, p. 113-117.

International Search Report and Written Opinion issued for PCT/US2015/051447 dated Dec. 14, 2015.

* cited by examiner

FIGS. 1A-1C
FIG. 1A
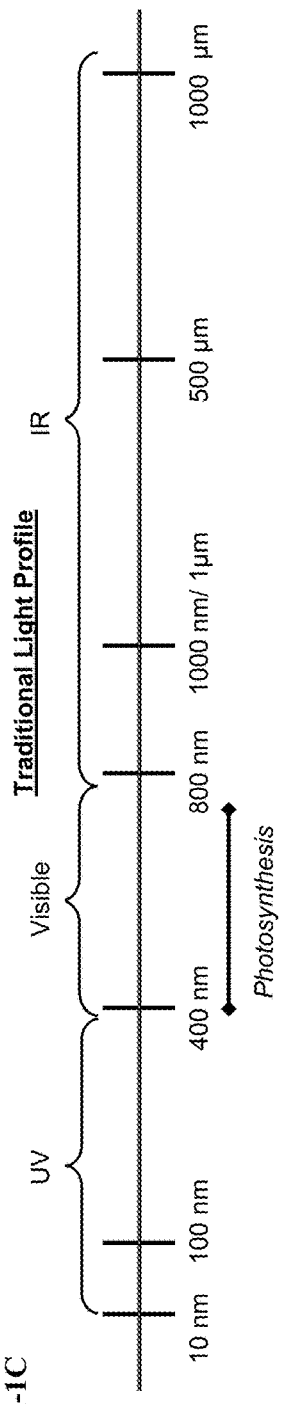
FIG. 1B
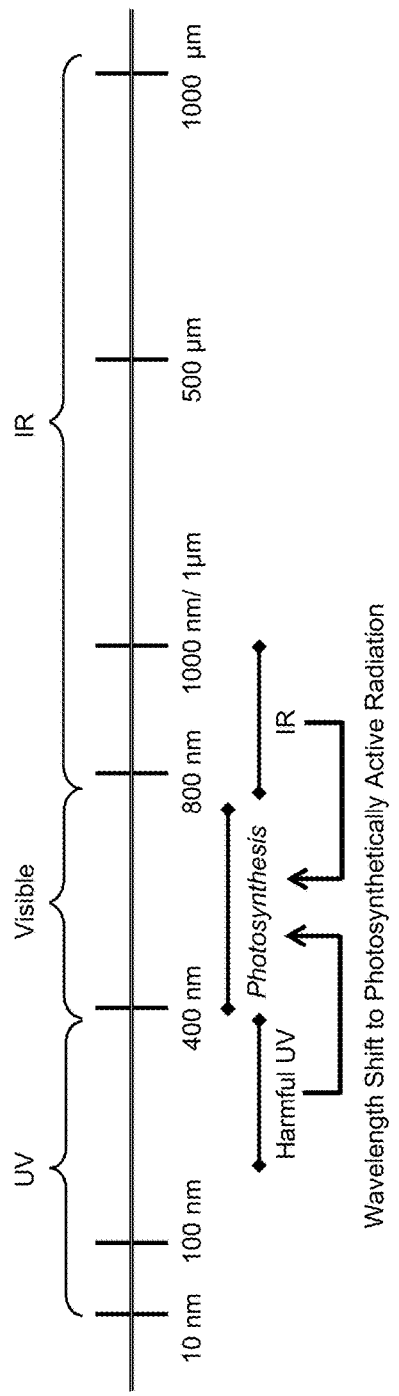
FIG. 1C
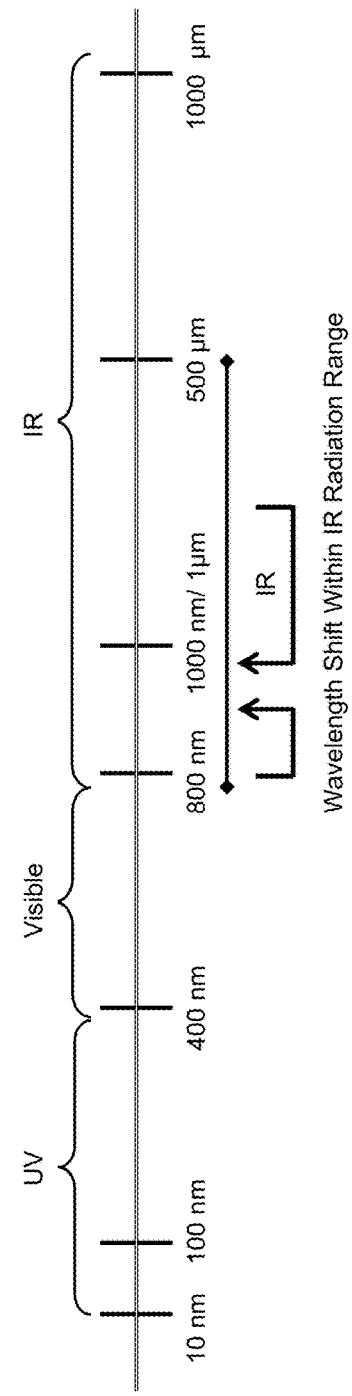

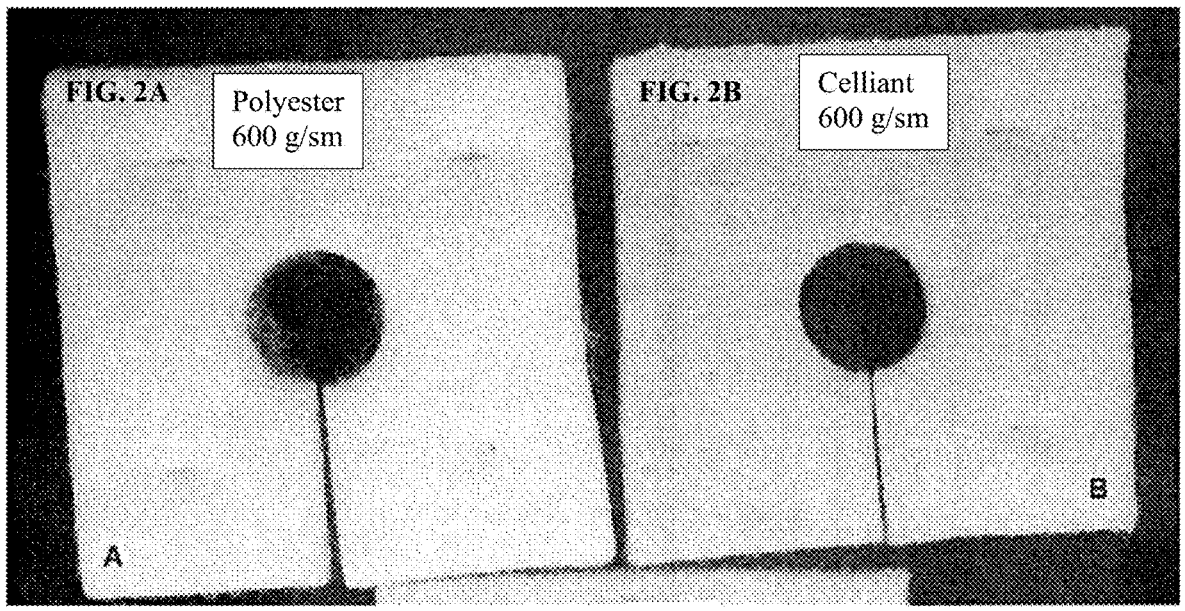
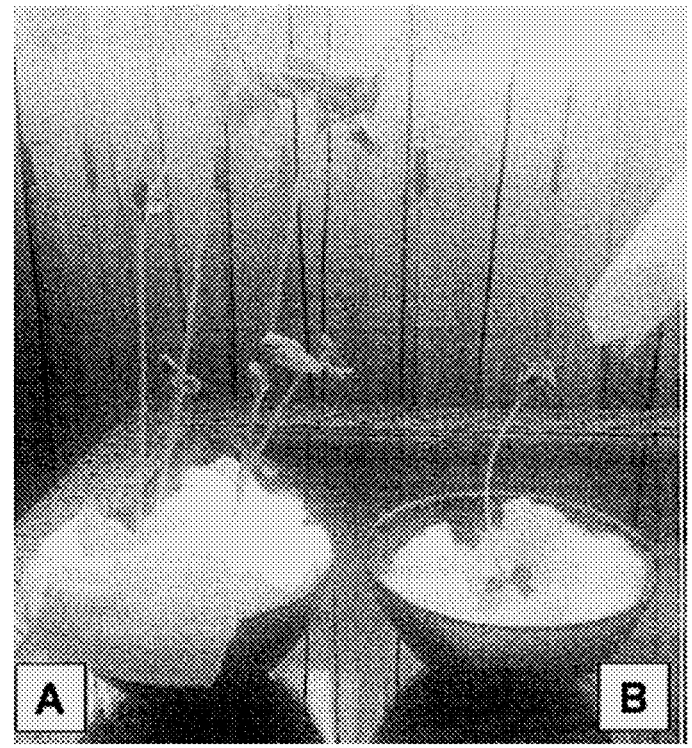
FIG. 3A                    FIG. 3B

Active Polymer Material System

FIG. 12  Reflectance spectrum on the wavelength range [3μm to 19μm]

*Transmittance spectrum on the wavelength range [0.2μm to 2.5μm]*

Transmittance spectrum on the wavelength range [3μm to 19μm]

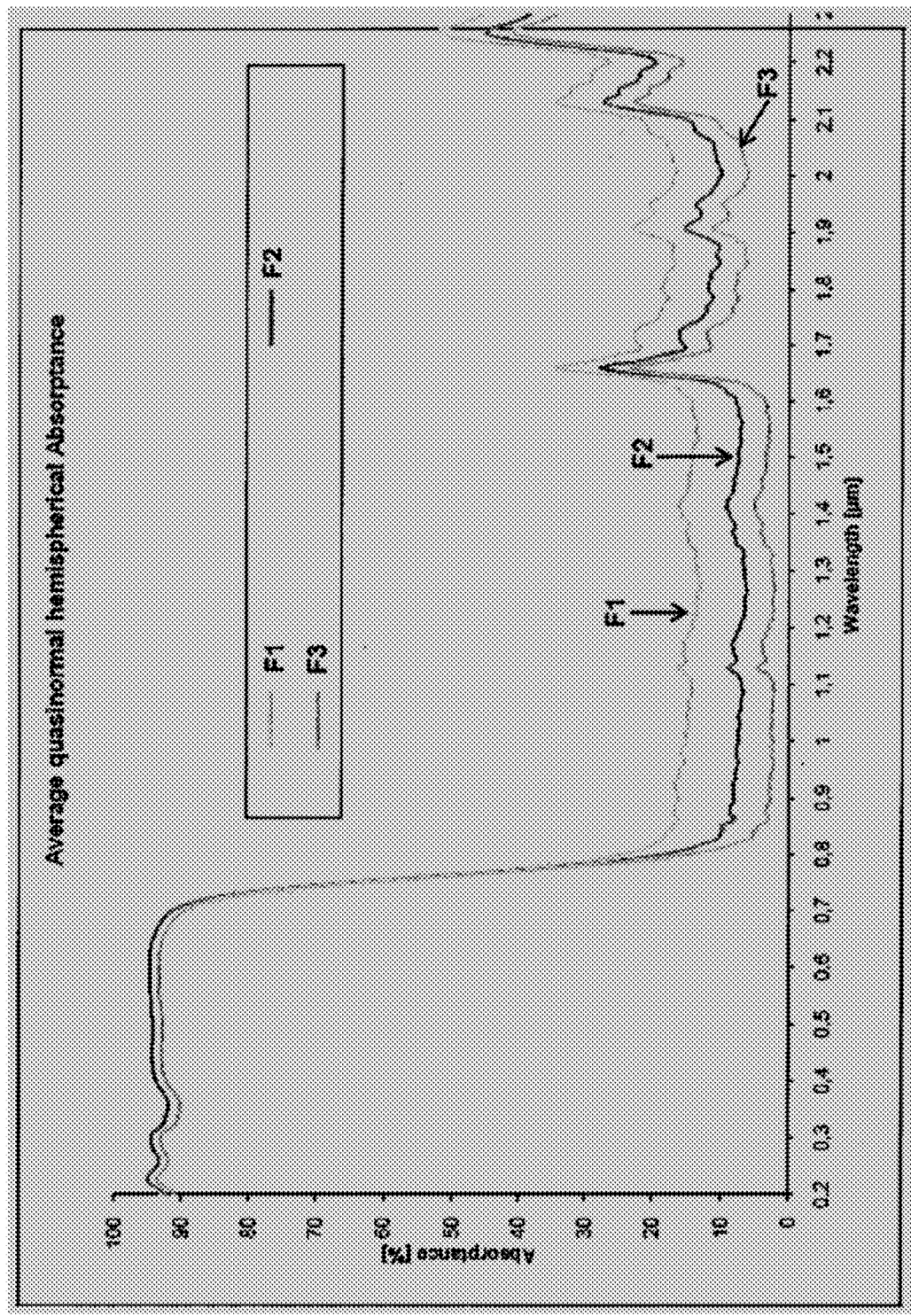
FIG. 15 *Absorptance spectrum on the wavelength range [0.2μm to 2.5μm]*

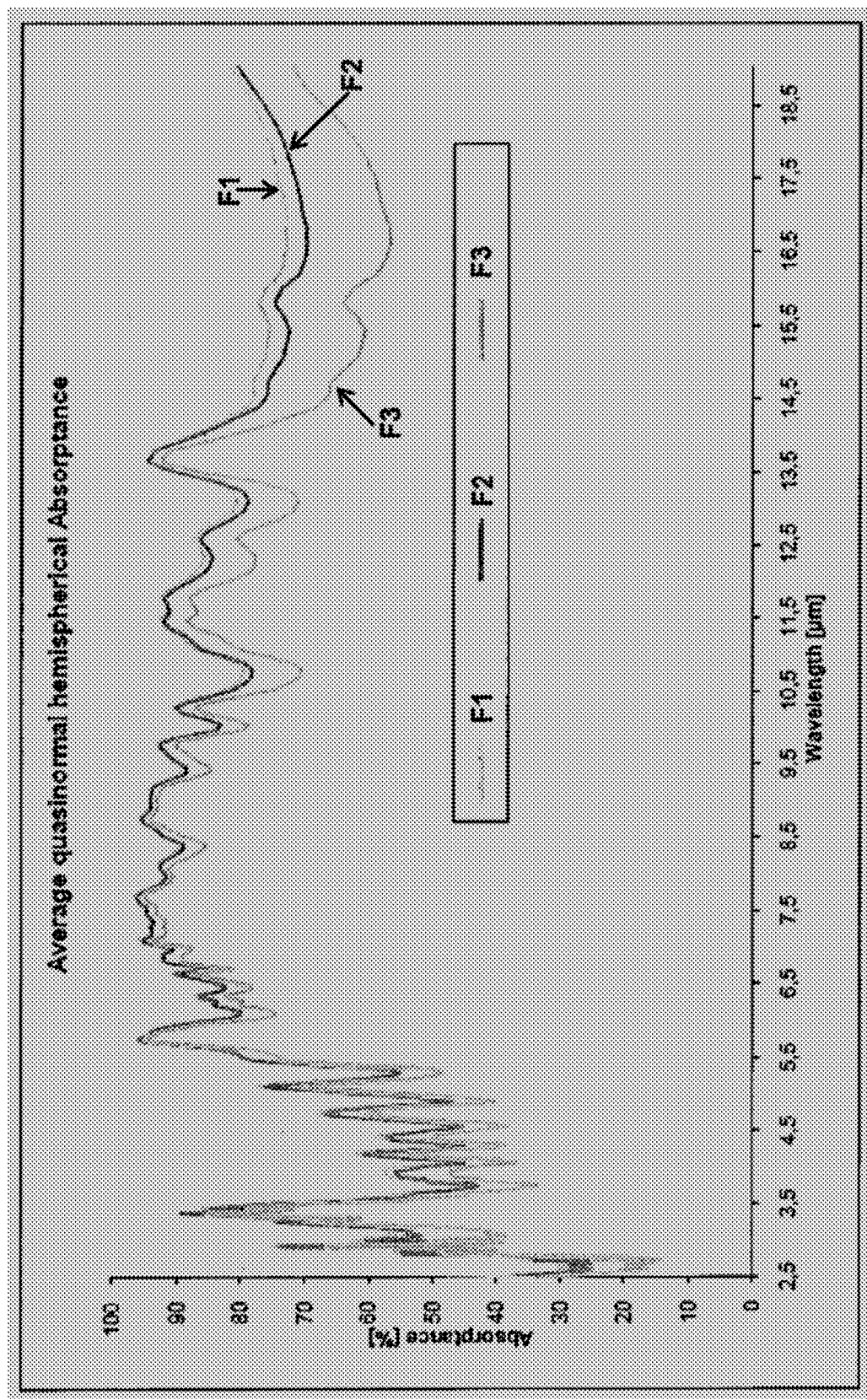
FIG. 16  *Absorptance spectrum on the wavelength range [3μm to 19μm]*

ACTIVE POLYMER MATERIAL FOR AGRICULTURAL USE

CROSS REFERENCE TO RELATED APPLICATIONS

This Application claims the benefit of U.S. Provisional Application No. 62/054,158, filed Sep. 23, 2014, the entire contents of which are hereby incorporated by reference in their entirety for all purposes.

FIELD

The present disclosure relates to methods of using an active polymer material as well as kits comprising an active polymer material for agricultural use.

BACKGROUND

Advancements in modern agricultural practices such as fertilization, pest control, plant breeding, and genetic engineering have revolutionized the production of food and raw materials. Over the past century, the development of agricultural technologies has allowed growers to meet the demands of a 400% increase in world population while simultaneously lowering the overall costs of agricultural products. With population growth rates predicted to increase, there is still a great need for improved agricultural technologies.

In particular, there is a growing demand for the development of agricultural technologies which improve plant growth without genetic modifications or chemical sprays.

SUMMARY OF THE DISCLOSURE

The present disclosure addresses the need for versatile materials that can, in some embodiments, be used to improve or otherwise alter plant growth, development, health and/or production. In some embodiments, an active polymer material capable of harvesting photon energy is used in an agricultural setting. In some embodiments, the present invention provides a composition of an active polymer material comprising one or more minerals suspended, embedded or otherwise incorporated in a polymer matrix which is useful in an agricultural setting.

In some embodiments, the active polymer material is placed in close proximity to and/or touching a plant, a plant part, or a plant tissue culture. In a specific embodiment, the active polymer material is placed within 30 cm from a plant, a plant part, or a plant tissue culture. In another embodiment, the active polymer material is placed on or mixed with the growth media in proximity to a plant or a plant part.

The active polymer material described herein exhibits interesting, useful and beneficial optical properties. In some embodiments, the active polymer material interacts with electromagnetic radiation by absorption, reflection, refraction, polarization, or wavelength shifting. In one embodiment, the active polymer material of this present disclosure absorbs a greater amount of infrared radiation when compared to a material made with only the polymer matrix provided with the same source of radiation.

In some embodiments, the active polymer material absorbs electromagnetic radiation in the range between about 400 nm to about 14,000 nm. In some embodiments, the active polymer material polarizes electromagnetic radiation in the range between about 400 nm to about 14,000 nm. In other embodiments, the active polymer material emits light in the range between about 200 nm and about 1,100 nm. In a specific embodiment, said active polymer material emits light in the wavelength between about 350 nm and about 800 nm.

The active polymer material can be constructed into different forms and shapes, which makes this material system very versatile. In some embodiments, the active polymer material is extruded into a fiber. In some embodiments, said fiber is meshed. In other embodiments, the active polymer material is extruded as a staple fiber. In some embodiments, the active polymer material is extruded into a film. These are basic forms of the active polymer material that can be further manipulated into more complex material forms. In some embodiments, any of these basic forms of the active polymer material is placed in close proximity to and/or touching a plant, a plant part, or a plant tissue culture.

In some embodiments, said fiber comprising the active polymer material is woven, stitched, knitted, or sewn into a textile or a fabric. In some embodiments, the textile is in a form of a bag. In a specific embodiment, the bag may be meshed. The bag may be used to hold a plant and its growth media. In some embodiments, said bag is filled with growth media and a plant is planted in the growth media.

In some embodiments, the textile is in the form of a sheet. In some embodiments, the sheet is meshed. In other embodiments, the sheet can be placed over the growth media. In a specific embodiment, an opening is cut out in the sheet to accommodate a stem or a trunk of the plant in order to place the sheet over the growth media and around the stems or trunks of the plants.

The fiber comprising the active polymer material is, in some embodiments, non-woven by felting, bonding, or fusing. In other embodiments, the active polymer material is non-woven into a batting material. In some embodiments, the batting material is die-cut into desired shapes such as squares, rectangles, circles, ovals, donut-like shape, or triangles, for example. In other embodiments, said die-cut material comprising the active polymer material is placed on top of the growth media and around a trunk or a stem of the plant.

In other embodiments, the fiber comprising the active polymer material is non-woven into a sphere-like shape, like a cotton ball, having a diameter of about 0.5 cm to about 5 cm. In some embodiments, the sphere-like shaped material comprising the active polymer material is placed on top of the growth media and around a trunk or a stem of the plant. In a specific embodiment, the sphere-like shaped material is mixed in with the soil and the soil is placed around a plant, a plant part, or a plant tissue culture. For one example of a sphere-like shaped material, see Example 7.

The active polymer material may comprise a variety of mineral compounds. In some embodiments, the active polymer material comprises one or more mineral types selected from the group consisting of silicon carbide (SiC), titanium dioxide ($TiO_2$), aluminum oxide ($Al_2O_3$), and silicon dioxide ($SiO_2$). In some embodiments, the total amount of all mineral comprises about 1% to about 2% of a total weight of the active polymer material.

The active polymer material may comprise one or more types of polymer matrix. In some embodiments, the active polymer material comprises one or more polymer types selected from the group consisting of polyethylene terephthalate (PET), polyester, nylon, rayon, and spandex.

The active polymer material used in agriculture, in some embodiments, is Celliant®.

A kit can be put together with the active polymer material with those components deemed important to be used in combination. In some embodiments, a kit comprises a plant, a plant part, or a plant tissue culture and an active polymer material which is capable of harvesting photon energy. The active polymer material comprises a polymer matrix and at least one type of mineral powder, wherein the mineral powder is suspended, embedded or otherwise incorporated in the polymer matrix. In some embodiments, the active polymer material which is a part of the kit interacts with electromagnetic radiation by absorption, reflection, refraction, polarization, or wavelength shifting. In one embodiment, the active polymer material absorbs greater amount of infrared radiation when compared to a material made with only the polymer matrix and provided the same source of radiation.

In some embodiments, the kit is in the form of a bagged or a potted plant. In other embodiments, the kit comprises a plant seed, bulb, tuber, tuberous root, rhizome, and/or corm embedded or enclosed in the active polymer material.

A different kit, in some embodiments, comprises a planting pot or a planting container and an active polymer material which is capable of harvesting photon energy. The active polymer material comprises a polymer matrix and at least one type of mineral powder, wherein the mineral powder is suspended, embedded or otherwise incorporated in the polymer matrix. In some embodiments, the kit comprises a planting pot or a planting container with the active polymer material placed inside it. In other embodiments, the kit comprises the planting pot or the planting container with the active polymer material lining the inside and/or outside walls of the planting pot or the planting container.

In some embodiments, a kit comprises a plant growth media and an active polymer material which is capable of harvesting photon energy. Said active polymer material comprises a polymer matrix and at least one type of mineral powder, wherein the mineral powder is suspended, embedded or otherwise incorporated in the polymer matrix. In some embodiments, the kit is in the form of a bagged growth media.

In some embodiments, one or more kits described previously comprise an active polymer material that emits light in the wavelength between about 200 nm and about 1,100 nm. In other embodiments, one or more kits described previously comprise an active polymer material that emits light in the wavelength between about 350 nm and about 800 nm. In some embodiments, one or more kits described previously comprise an active polymer material that is Celliant®.

One or more kits described previously, in some embodiments, comprise an active polymer material wherein one or more mineral types is selected from the group consisting of silicon carbide (SiC), titanium dioxide (TiO$_2$), aluminum oxide (Al$_2$O$_3$), and silicon dioxide (SiO$_2$). In other embodiments, one or more kits described previously comprise an active polymer material where one or more polymer type is selected from the group consisting of polyethylene terephthalate (PET), polyester, nylon, rayon, and spandex. In a specific embodiment, one or more kits mentioned previously comprise an active polymer material wherein the minerals comprise about 1% to about 2% of a total weight of the total active polymer material.

Harvesting photon energy, as mentioned earlier, encompasses a wide range of electromagnetic radiation. Some of the range in the electromagnetic spectrum is not beneficial to plants. In general ultraviolet light range (about 10-390 nm) may be harmful to plants. A material that could convert ultraviolet light range into visible light region (about 390-770 nm) would be beneficial for plant growth.

In some embodiments, an active polymer material capable of absorbing ultraviolet light in the range of about 10 nm to about 400 nm is used in an agricultural setting. The active polymer material comprises a polymer matrix and at least one type of mineral powder, which is suspended, embedded or otherwise incorporated in the polymer matrix. In a specific embodiment, the active polymer material is placed in close proximity to and/or touching the plant, plant part, or plant tissue culture.

In some embodiments, the active polymer material emits light in the wavelength between 200 nm and 1100 nm. In other embodiments, the active polymer material emits light in the wavelength between 350 and 800 nm in wavelength.

The active polymer material capable of absorbing ultraviolet light may be comprised of a variety of mineral compounds. In some embodiments, the active polymer material comprises one or more mineral types selected from the group consisting of silicon carbide (SiC), titanium dioxide (TiO$_2$), aluminum oxide (Al$_2$O$_3$), and silicon dioxide (SiO$_2$). In some embodiments, the total amount of all minerals comprises about 1% to about 2% of a total weight of said active polymer material.

The active polymer material capable of absorbing ultraviolet light may comprise one or more types of polymer matrix. In some embodiments, the active polymer material comprises one or more polymer types selected from the group consisting of polyethylene terephthalate (PET), polyester, nylon, rayon, and spandex.

The active polymer material, capable of absorbing ultraviolet light, used in agriculture, in some embodiments, is Celliant®.

BRIEF DESCRIPTION OF THE FIGURES

FIGS. 1A-1D depict a portion of the electromagnetic spectrum including ultraviolet light, visible light, and infrared light. FIG. 1A—depicts a traditional plant photosynthetic light use profile. FIG. 1B—depicts an example light manipulation by the active polymer material of the present invention, wherein damaging UV and other IR portions of the spectrum are shifted back into visible light in the photosynthetic range. FIG. 1C—depicts an example light manipulation by the active polymer material of the present invention, wherein IR light is absorbed and emitted, at a different wavelength than the wavelength that was absorbed. FIG. 1D-depicts an example light reflectance enhancement in the IR light range by the active polymer material of the present invention.

FIGS. 2A and 2B depict one embodiment of the soil covers of the present invention. FIG. 2A—control soil covers made with standard polyester. FIG. 2B—test soil covers made with active polymer material. The circular cut out in the center accommodates a plant's stem or a trunk.

FIGS. 3A and 3B illustrate the improved growth characteristics of plants grown with active polymer material. FIG. 3A—A plant grown with active polymer material. FIG. 3B—A plant grown with control polymer material (polyethylene terephthalate).

FIG. 4B—A cucumber control plant growing on untreated growth media.

FIG. 5A—Papaya plant grown with active polymer material. FIG. 5B—Untreated control papaya plant.

FIG. 15 is an absorptance spectrum on the wavelength range of 200 nm to 2500 nm (0.2 µm to 2.5 µm).

FIG. 16 is an absorptance spectrum on the wavelength range of 3000 nm to 19000 nm (3 µm to 19 µm).

DETAILED DESCRIPTION OF THE DISCLOSURE

Definitions

Figure 1D:
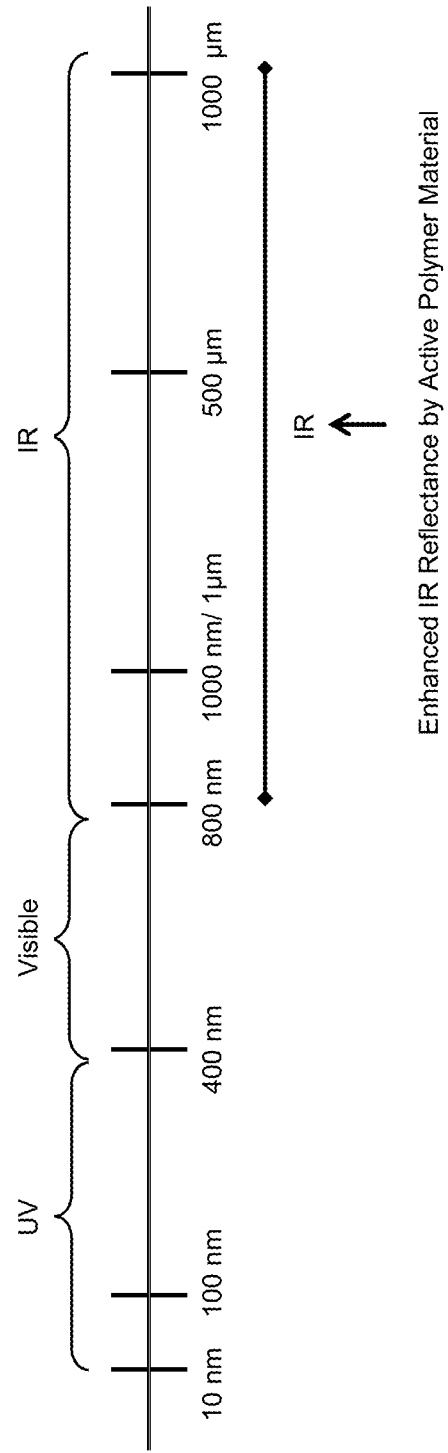

While the following terms are believed to be well understood by one of ordinary skill in the art, the following definitions are set forth to facilitate explanation of the presently disclosed subject matter The term "a" or "an" refers to one or more of that entity; for example, "a plant" refers to one or more plants or at least one plant. As such, the terms "a" (or "an"), "one or more" and "at least one" are used interchangeably herein. In addition, reference to "an element" by the indefinite article "a" or "an" does not exclude the possibility that more than one of the elements is present, unless the context clearly requires that there is one and only one of the elements.

As used herein, the verb "comprise" as is used in this description and in the claims and its conjugations are used in its non-limiting sense to mean that items following the word are included, but items not specifically mentioned are not excluded.

As used herein, the term "plant" refers to any living organism belonging to the kingdom Plantae (i.e., any genus/species in the Plant Kingdom). This includes familiar organisms such as but not limited to trees, flowering plants, herbs, bushes, grasses, vines, ferns, mosses and green algae. The term refers to both monocotyledonous plants, also called monocots, and dicotyledonous plants, also called dicots. Non-limiting examples of particular plants include corn, potatoes, roses, apple trees, sunflowers, wheat, rice, bananas, tomatoes, pumpkins, squash, lettuce, cabbage, oak trees, geraniums, hibiscus, clematis, poinsettias, sugarcane, taro, duck weeds, pine trees, coconut trees, brassica leafy vegetables (e.g., broccoli, broccoli raab, Brussels sprouts, cabbage, bok choy, Napa cabbage, cauliflower, cavalo, collards, kale, kohlrabi, mustard greens, rape greens, and the like), leafy vegetables (e.g., romaine, iceberg, and the like), bulb vegetables (e.g., garlic, leek, onion, shallot, and the like), citrus fruits (e.g., grapefruit, lemon, lime, orange, tangerine, citrus hybrids, pomelo, and the like), cucurbit vegetables (e.g., cucumber, citron melon, edible gourds, gherkin, muskmelons, water-melon, cantaloupe, squash, pumpkin, zucchini, and the like), fruiting vegetables (e.g., eggplant, ground cherry, pepino, pepper, tomato, tomatillo, and the like), root/tuber and corm vegetables (e.g., potato, carrot, beet, and the like), tree nuts (e.g., almond, pecan, pistachio, walnut, and the like), berries (e.g., barberry, currant, elderberry, gooseberry, honeysuckle, mayapple, nannyberry, hackberry, bearberry, lingonberry, strawberry, sea grape, lackberry, cloudberry, loganberry, raspberry, salmonberry, thimbleberry, wineberry and the like), cereal crops (e.g., corn, rice, wheat, barley, sorghum, millet, oat, rye, triticale, buckwheat, fonio, quinoa, and the like), pome fruit (e.g., apples, pears, and the like), stone fruits (e.g., coffee, jujube, mango, olive, coconut, oil palm, pistachio, apricot, cherry, damson, nectarine, peach, plum, and the like), vine (e.g., grape, kiwi, and the like), fiber crops (e.g., hemp, cotton, flax, and the like), and ornamentals (e.g., turf, geranium, pelargonia, petunia, begonia, fuchsia, and the like) to name a few. The plant may in some embodiments be a household/domestic plant, a greenhouse plant, an agricultural plant, a silvicultural plant, or a horticultural plant. In some embodiments the plant may be a hardwood such as one of acacia, eucalyptus, hornbeam, beech, mahogany, walnut, oak, ash, willow, hickory, birch, chestnut, poplar, alder, maple, sycamore, ginkgo, a palm tree, sweet gum, and the like. In some embodiments the plant may be a conifer such as a cypress, a fir, a sequoia, a hemlock, a cedar, a juniper, a larch, a pine, a redwood, a spruce, a yew and the like. In some embodiments the plant may be a fruit bearing woody plant such as apple, plum, pear, banana, orange, kiwi, lemon, cherry, grapevine, papaya, peanut, fig, and the like. In some embodiments the plant may be a woody plant such as cotton, bamboo and a rubber plant. The plants, in some embodiments, are of economic importance. According to the context of its use, in some instances the term "plant" may also be intended to include any plant propagules, plant parts, or plant tissue cultures in addition to the whole plant.

As used herein, the term "plant part" refers to both complete plants and of parts of plant. Non-limiting examples of plant part may include embryos, pollen, ovules, seeds, bulbs, tubers, tuberous roots, rhizomes, corms, leaves, flowers, branches, fruit, kernels, ears, cobs, husks, stalks, roots, root tips, anthers, stem shoots, scions, rootstocks, needles, stalks, plant protoplasts, plant cells including plant cells that are intact in plants and/or parts of plants, plant calli, plant clumps, plant tissues, plant tissue cultures, and the like.

As used herein, the term "plant tissue culture" refers to a composition comprising isolated cells of the same or a different type or a collection of such cells organized into parts of a plant. Non-limiting examples of plant tissue cultures include plant protoplasts, plant calli, plant clumps, and plant cells that can generate tissue culture that are intact in plants or parts of plants, such as embryos, pollen, flowers, seeds, pods, leaves, stems, roots, root tips, anthers, pistils and the like.

As used herein, the term "agricultural use" refers to use of the designated compound or a material in association with growing a plant or in association with the land used to grow plants or to raise animals for food or economic gain. Agriculture use encompasses all types of agricultural landscapes and types. Non-limiting examples of different agricultural types or technique include greenhouses, plains, fields, paddy fields, deserts, marsh, terraces, hills, fells, hydroponics, semi-hydroponics, aeroponics, fogponics, organoponics, undergrounds, tunnels, walls, indoor fields, indoor gardens, gardens, rooftops, bonsai, planters and pots, grow boxes, grow rooms, Fokewalls, and the like.

As used herein, "improved plant growth" or "improved growth characteristic" refer to the improvement of at least one morphological, physiological and/or phenotypical characteristic of a treated plant (i.e., a test plant) when compared to an untreated plant (i.e., a control plant). Representative plant growth parameters include but are not limited to the following: above ground height, above ground plant width, root mass, number of branches, branch angle, total above ground plant mass, total plant weight, days to first flower, number of fruits, weight of fruits, mean fruit weight, number of seeds, weight of seeds, mean seed weight, tuber weight, tuber diameter, leaf size, leaf weight, leaf length, leaf width, leaf area, number of leaves, stem length, stem weight, stem diameter, number of petioles, length of petioles, number of ovaries, pollen amount, pollen size, standability, resistance to lodging, disease resistance, disease avoidance, cold hardiness, heat tolerance, drought tolerance, days to maturity, days to pollen release, color, emergence, rate of photosynthesis, number of nodes, length of node, number of lateral roots, length of primary root, number of stomata, density of stomata, number of stolans, stolan length, number of rhizomes, rhizome length, and harvestibility. In some embodiments, weight of a plant or a plant part refers to fresh weight or dried weight.

As used herein, the term "active polymer" refers to a system comprising one or more types of minerals and a polymer matrix wherein said mineral particles are suspended, embedded, or otherwise incorporated in said polymer matrix. The active polymer is capable of harvesting photon energy. The active polymer will be described in greater detail elsewhere herein. For the purposes of this application, the terms "active polymer" and "active polymer material" are used interchangeably.

As used herein, the phrase "harvest photon energy" refers to the act of absorbing photons whereby a molecule or atom comprising the material absorbing the photon transitions from the ground state to the excited state. Photons are particles representing quantum units of light, both visible and invisible to the naked eye, and carrying energy proportional to the electromagnetic radiation frequency.

As used herein, the term "absorption" refers to the physical process of absorbing light and term "absorbance" refers to a mathematical quantity expressing the ratio of light or radiation that falls upon a material and the amount that gets transmitted through the material. As used herein, the term "absorptivity" and "absorptance" refers to the optical absorption properties exhibited by a material.

As used herein, the term "transmission of light" refers to the light that is passed through a material without being absorbed. As used herein, the term "transmissivity" and "transmittance" refers to the optical transmission properties exhibited by a material.

As used herein, the term "reflection" refers to the light that bounces back upon hitting a material or the light and its energy that is re-emitted upon hitting a material. As used herein, the term "reflectivity" or "reflectance" refers to the optical reflection properties exhibited by a material.

As used herein, the term "refraction" refers to a change in the transmitted light direction due to change in the transmission medium such as water or glass.

As used herein, the term "polarize" refers to the physical process in which light or radiation reflects off of or partially passes through a particle or a material where the direction of electric and magnetic field vectors in the wave is altered. Polarization of light or radiation may be partial or complete.

As used herein, the term "emit light," "emitting light," or "emission of light" refers to the physical process in which the excited state of the molecule or an atom due to absorption of energy falls back to its ground state thereby releasing energy in the form that can be quantified by its wavelength or a range of wavelengths. As used herein, the term "emissivity" or "emittance" refers to the optical emission properties exhibited by a material.

It is noted that the National Institute of Standards and Technology (NIST) has recommended to reserve the ending "-ivity" (such as in reflectivity and transmissivity) for radiative properties of pure, perfectly smooth materials and using the ending "-ance" (such as in reflectance and transmittance) for rough and contaminated surfaces.

As used herein, the term "light scattering" refers to a physical process in which light is reflected off of an object in many different directions due to the irregularities of the hitting surface or when hitting interfering particles, that is in between the object and the source of light. Small particles suspended in air can cause light scattering.

As used herein, the term "refractive index" refers to the ability of a particular substance to bend light when light is entering said substance.

As used herein, the term "extrude" refers to a process in which a material is forced out through a die to form material into certain shapes.

As used herein, the term "fiber" refers to an elongated, thread-like structured material having a characteristic longitudinal dimension (length) and a characteristic transverse dimension (diameter), wherein fibers can be used as component of a composite material by weaving or stitching. Fibers can be short (discontinuous) or long (continuous).

As used herein, the term "denier" refers to a unit of measure for the linear mass density of fibers. For example, a fiber having a length of 9000 m and weighing 1 gram has a denier of 1.

As used herein, the term "staple fiber" refers to a short or discontinuous fiber where the length of the fiber is cut in the length approximately from about 0.1 cm to about 15 cm.

As used herein, the term "film" refers to a flat or tubular flexible structure of the material used.

As used herein, the term "mesh" refers to a composition constructed of a material having the appearance of a net (e.g., with holes, or pores).

As used herein, the term "batting material" refers to a material made of a soft, bulky assembly of non-woven fibers or foam.

As used herein, the term "die-cut" refers to a process in which fiber, textile, or material is cut into shapes using a die.

As used herein, the term "growth media," "growing media," or "plant growth media" refers to various natural and artificial media which support plant growth. Non-limiting examples include natural or artificial soil, peat moss, sand, clay, pumice, organic mulch, rock, wool, rockwool, vermiculite, growstones, coir, rice hulls, perlite, gravel, wood fiber, sheep wool, brick shards, polystyrene packing peanuts, natural and synthetic fibers, potting mixtures of organic and inorganic matter, artificial media such as polyurethane foam, and the like.

As used herein, the term "kit" refers to components intended for use together. An indication that components of a kit are for use together can be, for example, packaging of the components in a single package, or labeling either or both of the components as being for use in combination, or both.

As used herein, the term "Celliant®" refers to a patented material and technology described by U.S. Pat. No. 7,074,499. Celliant® is a bi-component material comprising of thermo-reactive particles which are embedded into fibers.

Textile made from Celliant® fiber is shown to effectively convert body heat into medically useful infrared radiation. Therapeutic values of infrared radiation include promotion of blood circulation and increase in oxygen level in the blood stream. In some embodiments Celliant® comprises 55% SiC, 25% $TiO_2$, 5% $SiO_2$, and 15% $Al_2O_3$ minerals composition.

Unless defined otherwise, all technical and scientific terms used herein have the same meanings as commonly understood by one of ordinary skill in the art to which this invention belongs. Preferred methods, devices, and materials are described, although any methods and materials similar or equivalent to those described herein can be used in the practice or testing of the present invention. All references cited herein are incorporated for all purposes by reference in their entirety.

Plants and Electromagnetic Radiation

The sun produces electromagnetic radiation over a broad spectrum including ultraviolet light, visible light, and infrared light. Ultraviolet (UV) light has wavelengths from about 10 nm to about 390 nm which can be further subdivided into far (10 to 200 nm), mid (200 to 300 nm), and near (300 to 390 nm) spectra regions. Next to the UV light region is the visible light region which carries less energy than UV light. Visible light is only a small band in the electromagnetic spectrum with wavelengths between about 390 nm and about 770 nm, which are further divided into violet (390-450 nm), blue (450-495 nm), green (495-570 nm), yellow (570-590 nm), orange (590-620 nm), and red light (620-770 nm). Infrared (IR) light, even less energy than the visible light, spans from about 770 nm to about 1060 μm and includes near (770 to 1500 nm), mid (1500 nm to 6 μm), and far (6 to 1060 μm) regions. A depiction of various regions of the electromagnetic spectrum can be seen in FIG. 1 of the application.

Plants depend on energy from the sun to grow. Photosynthesis is a well-known chemical reaction by which electromagnetic radiation is absorbed through chlorophyll pigments to trigger electron transport chains, and ultimately lead to the production of chemical energy stored in the form of proteins, sugars, and oils. This process however only utilizes a small portion of the solar radiation.

Photosynthesis typically only occurs with visible light in the range of about 400 nm to 700 nm, which makes up about 42% of the total solar radiation energy. Even within this narrow range, light absorption by the chlorophyll pigments of green plants is further focused on the 430 nm (blue) and 670 nm (red) regions of the spectrum (Singhal, G. S. et. al. "Concepts in Photobiology: Photosynthesis and Photomorphogenesis" Eds. 1999, Kluwer Academic Publishers). Thus photosynthesis, while critical to plant growth only utilizes a small portion of the electromagnetic radiation emitted by the sun.

Other portions of the light spectrum can affect plant growth and development in other ways. For example, plants have evolved light receptors which allow them to "sense" their environments and respond to changing conditions (Photomorphogenesis, Singhal, G. S. et. al. "Concepts in Photobiology: Photosynthesis and Photomorphogenesis" Eds. 1999, Kluwer Academic Publishers). Changes in light intensities, periods, and wavelengths can have profound effects on plant morphologies ranging from germination, flowering times, shade avoidance, vegetative growth, anthocyanin accumulation, and stomatal openings (Wang et al. "Contributions of green light to plant growth and development" *Am. J. Botany* 2013, 1, 70-78). Furthermore, each plant's response to various light cues will depend on the species, growth stage, and geographical acclimation of said plant. For example, the germination of certain species is triggered by red light, while the germination of other species is triggered by blue light, or a combination of blue or red light with green light (Wang et al. "Contributions of green light to plant growth and development" *Am. J. Botany* 2013, 1, 70-78).

Another important role of solar radiation is its ability to produce heat. IR radiation accounts for almost half of the solar radiation reaching the earth (about 49%). This IR portion of the spectrum is readily absorbed by water and carbon dioxide molecules which in turn convert that energy into heat released into the environment. By affecting the temperature of soils and plants, IR light can influence the growth and development of plants ("Soil Temperature and Plant Growth in the Northern Great Plains" Willis, W. O et al. Prairie: A Multiple View: 1975, University of North Dakota Press, Grand Forks, Wali, Mohan K. Ed.). Indeed soil temperature can have profound effects on the timing and speed of plant seed germinations (Roberts E H et al., "Temperature and Seed Germination." Sympo Soc Exp Biol 1988; 42:109-32). IR radiation has also been found to increase microbial activity and result in favorable conditions for plant growth such as faster breakdown of nutrients by microbes (*Nature* 2006, 440, 165-173).

Plants themselves may also use solar radiation for their own purposes. By carefully controlling the spectrum of reflected light, plants have evolved visual cues to discourage potential predators (e.g., herbivores), and attract desired pollinators (e.g., insects and birds) (Lunau, K. et. al. "Innate Colour Preferences of Flower Visitors" *J. Comp. Physiol. A* 1995, 177, 1-19). In some cases, the reflective properties of a flower have evolved such that the reflected spectrum is only visible to selected organisms (Vignolini et al. 2014, "The flower of Hibiscus trionum is both visibly and measurably iridescent." New Phytol July 16).

Solar radiation outside of the visible light range can also be harmful to plants, especially when shined in excess. UV light constitutes only about 8% of total solar radiation, but can cause serious damages to plant DNA, proteins, and membranes (UV-B light 280-315 nm) (*Trends in Plant Science* 1998, 3, 131-135). UV-B light is present even if the sunlight is mostly blocked by the clouds on an overcast day. The ratio of UV-B light and visible light is also important in protecting the plants from UV-B damage. Thus, consecutive cloudy days may be damaging to plants because the ratio of UV-B to visible light is high (*Plant, Cell & Environment* 1994, 17, 295-301).

Optimizing Plant Growth Through Light Manipulation

The manipulation of light to optimize plant growth has been a goal of growers for many years. One type of light manipulation has been the attenuation of light intensity through the use of shade coverings (Ghosal et al. 2003. "Modeling and experimental validation of a greenhouse with evaporative cooling by moving water film over external shade cloth" Energy and Buildings Vol 35:8 pg 843-850). Other attempts at using colored materials have led to limited control of visible spectrums through coverings or nettings (Al-Helal, I. M. et. al. "Measuring and Evaluating Solar Radiative Properties of Plastic Shading Nets" 2011, 95, 677-683).

Perhaps one of the most obvious examples of light manipulation has been the use of greenhouses for indoor plant cultivation. Greenhouses are traditionally built to retain the effects of IR radiation, while also using glass panels to filter out harmful UV spectrums. Modern greenhouses are also equipped with sophisticated shading and lighting systems to supplement for reduced solar radiation, or protect plants from excess exposure.

More recently, the use of custom light emitting diode lamps (LEDs) have allowed researchers to carefully tailor light profiles to meet individual plant's needs in laboratory settings and limited greenhouse settings. For example, in a particular experiment, increased levels of blue light were found to stunt strawberry plant elongation, while increased red light was found to increase plant height and flowering rate (Folta et al, 2008 "Light as a Growth Regulator: Controlling Plant Biology with Narrow-bandwidth Solid-state Lighting Systems" HortScience 2008, 7, 1951-1956).

Another example of light manipulation to regulate plant growth is the use of polarized light. Polarization refers to the physical process in which the direction of light wave vibration is altered. Solar radiation is not polarized as it shines onto the Earth. Non-polarized light from the sun thus exhibits wave vibrations in all directions. Polarizers are materials that filter specific directions of wave vibration, only allowing single direction wave orientations to pass through. One of the most familiar examples of this phenomenon is the production of polarized sunglasses which can be designed to reduce light reflections with certain wave orientations. Certain polarizers, such as a circular polarizer, have been shown to affect plant growth when the polarized light is absorbed by the interior of the leaves or the stems (Shibayev, P. P. et. al. "The Effect of Circularly Polarized Light on the Growth of Plants" Int. J. Botany 2011, 7, 113-117).

These experiments, while key for developing the concepts of dynamic light manipulation, are not practical for consumer application. The equipment and energy costs associated with LED lighting make efforts to provide artificial lighting at a large scale very expensive if not cost-prohibitive. Similarly, the indiscriminate use of polarizing filters can significantly reduce light intensity and lead to undesirable plant morphologies. Finally, the above described laboratory approaches only accounted for the use of light as a biological signal, and did not include teachings of the outdoor manipulation of the effects of IR heating, or the selective mitigation of UV radiation. Furthermore, current limiting applications of LED lighting for the use in greenhouses have excluded far IR considerations as an effective wavelength use.

Thus there still exists a need for alternative methods to manipulate light spectra in commercial greenhouse and field settings.

Active Polymer Material

The present disclosure addresses the challenges associated with harvesting solar energy and effectively utilizing it for plant growth. The present disclosure is based in part on the inventors' discovery that active polymer materials (APM) can be produced to create custom light reflection and absorption profiles designed to enhance plant growth and/or direct plant development. The present disclosure teaches APM compositions, and methods for producing and using said APMs.

In some embodiments, APMs comprise at least one type of mineral and a polymer matrix, wherein the mineral is suspended, embedded or otherwise incorporated in the polymer matrix. In some embodiments, the active polymer material is capable of absorbing photon energy in the electromagnetic light spectrum and shifting the wavelength of light to another desired portion of the spectrum. In other embodiments, the active polymer material interacts with electromagnetic light by absorbing, reflecting, refracting, polarizing and/or shifting the wavelength. Thus in some embodiments the APM combines the mineral and polymer components to create custom light absorption and reflective profiles.

Mineral Used in the Active Polymer Material

In some embodiments, the active polymer material comprises at least one type of mineral. Said mineral is selected based upon several characteristics. In some embodiments, mineral of the present invention are biologically benign, or inert. In other embodiments, said mineral exhibits optical properties of being transparent or semi-transparent.

Fluorescence

In some embodiments, the mineral of the present invention is chosen for its ability to fluoresce. For example, in some embodiments, the present invention teaches the use of minerals such as calcites and ambers which fluoresce under UV light in various colors of the visible range. Thus in some embodiments, the minerals of the present invention absorb radiation in the UV spectrum, not visible to human eyes, and release said energy in the form of light in the visible light range. For representative examples of UV shifting minerals, see EP 0579835, U.S. Pat. No. 5,958,294, and Chinese Pat. App. No. 103,224,660.

In some embodiments, the mineral of the present invention comprise one or more compounds of the general descriptor $X_mY_n$, wherein X does not equal Y (e.g., X≠Y), one or more elements can be selected to form X, one or more elements can be selected to form Y, and m and n are greater than or equal to 1 and less than or equal to 100, independently ($1 \leq m \leq 100$ and $1 \leq n \leq 100$). The elements that make up the compositions of X and Y are independently selected from the group consisting of hydrogen (H), lithium (Li), beryllium (Be), sodium (Na), magnesium (Mg), potassium (K), calcium (Ca), rubidium (Rb), strontium (Sr), cesium (Cs), barium (Ba), francium (Fr), radium (Ra), scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lutetium (Lu), hafnium (Hf), tantalum (Ta), tungsten (W,) rhenium (Re), osmium (Os), iridium (Ir), platinum (Pt), gold (Au), mercury (Hg), lawrencium (Lr), rutherfordium (Rf), dubnium (Db), seaborgium (Sg), bohrium (Bh), hassium (Hs), meitnerium (Mt), darmstadtium (Ds), randon (Rn), indium (In), boron (B), carbon (C), nitrogen (N), oxygen (O), fluorine (F), aluminum (Al), silicon (Si), phosphorus (P), sulfur (S), chlorine (Cl), gallium (Ga), germanium (Ge), arsenic (As), selenium (Se), bromine (Br), indium (In), tin (Sn), antimony (Sb), tellurium (Te), iodine (I), lead (Pb), bismuth (Bi), polonium (Po), astatine (At), ununtrium (Uut), thallium (Tl), ununpentium (Uup), lutetium (Lu), ununseptium (Uus), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), and nobelium (No).

In some embodiments, the mineral comprises one type of mineral compound. In other embodiments, the mineral comprises one or more types of mineral compounds. Thus in some embodiments the mineral may comprise $X_mY_nZ_o$ formula, where X, Y and Z each represent an element or a mineral compound and m, n and o represent the relative ratios of their respective elements or mineral compounds. In other embodiments, the mineral may comprise $X_mY_nZ_oW_p$ formula, where X, Y, Z, and W each represent an element or a mineral compound and m, n, o, and p represent the relative ratios of their respective elements.

In some embodiments, X, Y, Z, and W in the mineral composition of $X_mY_nZ_oW_p$, is each selected from the group consisting of Si, Ti, Al, Ca, Na, Cu C, O, N, and S.

In other embodiments, one or more minerals in the active polymer material are selected from the group consisting of silicon carbide (SiC), calcium carbide ($CaC_2$), titanium dioxide ($TiO_2$), aluminum oxide ($Al_2O_3$), and silicon dioxide ($SiO_2$).

In some embodiments, the minerals in the active polymer material comprise SiC, $TiO_2$, $SiO_2$, and $Al_2O_3$.

Mineral Size and Shape

In some embodiments, the mineral particles of the present invention are processed into certain sizes or shapes to alter their optical properties. In some embodiments, the mineral particles are reduced in size and shape by a process known in the art, such as grinding, polishing, or tumbling. These processes help to determine the particle size of the mineral, the concentration of each type of minerals, and the physical characteristics of the mineral. The physical characteristics may include the smoothness and/or shape of the mineral particles.

In some embodiments, the mineral particles are reduced in size to a substantially scalloped shape. Said substantially scalloped shaped mineral particles may shift wavelengths of received light. In other embodiments, the mineral particles are reduced in size to substantially spherical shape. Said substantially spherical shaped mineral particles may shorten wavelength of the received light. In other embodiments, the mineral particles are reduced in size to substantially triangular shape with round edges. Said substantially triangular shaped mineral particles with round edges may reflect, absorb, or scatter the received light. In other embodiments, the mineral particles are reduced in size to substantially convex shape. While not wishing to be bound to any particular theory, we believe said substantially convex shaped mineral particles allow for maximum surface area to interact with light.

In some embodiments, the average mineral particle size is about 0.5 to about 2.0 microns. That is, the mineral particle may have an average size of about 0.50 microns, 0.55 microns, 0.60 microns, 0.65 microns, 0.70 microns, 0.75 microns, 0.80 microns, 0.85 microns, 0.90 microns, 0.95 microns, 1.00 microns, 1.05 microns, 1.10 microns, 1.15 microns, 1.20 microns, 1.25 microns, 1.30 microns, 1.35 microns, 1.40 microns, 1.45 microns, 1.50 microns, 1.55 microns, 1.55 microns, 1.60 microns, 1.65 microns, 1.70 microns, 1.75 microns, 1.80 microns, 1.85 microns, 1.90 microns, 1.95 microns, or 2.00 microns.

In some embodiments, the average mineral particle size is about 0.5 to about 2.0 microns. That is, the mineral particle may have an average size is in the range of about 0.50-0.60 microns, 0.60-0.70 microns, 0.70-0.80 microns, 0.80-0.90 microns, 0.90-1.00 microns, 1.00-1.10 microns, 1.10-1.20 microns, 1.20-1.30 microns, 1.30-1.40 microns, 1.40-1.50 microns, 1.50-1.60 microns, 1.60-1.70 microns, 1.70-1.80 microns, 1.80-1.90 microns, and 1.90-2.00 microns.

In some embodiments, the mineral particle size may be related to the target wavelength of its absorption. For example, if the target absorption is about 750 nm, then the mineral particle may be reduced to a size of about 750 nm.

In some embodiments, the mineral particles may be ground to reach an approximate particle size of about 0.5 microns to about 2.0 microns. For example, titanium dioxide may be ground to a grain size of between about 1 micron and about 2 microns and may be triangular with rounded edges. Aluminum oxide may be ground to a grain size of between about 1 and about 1.5 microns and may be scalloped-shaped. Silicon dioxide may be ground to a grain size of about 1 to about 1.5 microns and is generally rounded.

In some embodiments, the present invention teaches a dry weight ratio of the active materials of 55% SiC, 25% $TiO_2$, 5% $SiO_2$, and 15% $Al_2O_3$.

Polymer Matrix

In some embodiments, the minerals of the APMs are embedded within a polymer matrix. In some embodiments, the polymers for the APMs are chosen for their ability to hold the mineral particles. In other embodiments, the polymers for the APMs are chosen so that the mineral and the polymer matrix do not chemically react.

In other embodiments, the polymers of the APMs are chosen for their ability to be shaped or manufactured for particular uses. Some polymers are flexible and can be manipulated and re-shaped multiple times. For example, polyethylene terephthalate (PET) is a thermally induced shape-memory polymer that can lose its form at high temperatures, and be reformed into useful shapes.

In some embodiments, the polymers of the APMs are chosen for their compatibility with the environment. For example, soil covers made from polymer carbohydrates and vegetable fillers are known to be biodegradable (see for example U.S. Pat. No. 5,879,695). In another example, a soil cover made of polyethylene polymer fibers are durable yet photodegradable and slowly degrades when used outdoors (U.S. Pat. No. 5,532,298). In some embodiments, the APMs can be formed into useful materials such as fibers and films based on the properties of the polymer matrix used.

In other embodiments, the polymers of the present invention are selected based on their ability to interact with light radiation by absorbing, reflecting, refracting, and/or changing the wavelength. In some embodiments, PET polymers are effective in polarizing solar radiation In some embodiments, the polymer matrix of the present invention may be selected from a group consisting of rayon, acrylonitrile butadiene styrene, acrylic, celluloid, cellulose acetate, cycloolefin copolymer, ethylene-vinyl acetate, ethylene vinyl alcohol, fluoroplastics, ionomers, KYDEX®, liquid crystal polymer, polyacetal, polyacrylates, polyacrylonitrile, polyamide, polyamide-imide, polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoates, polyketone, polyester, polyethylene, polyetheretherketone, polyetherketoneketone, polyetherimide, polyethersulfone, polyethylenechlorinates, polyimide, polylactic acid, polymethylpentene, polyphenylene oxide, polyphenylene sulfide, polyphthalamide, polystyrene, polysulfone, polytrimethylene terephthalate, polyurethane, polyvinyl acetate, polyvinyl chloride, polyvinylidene chloride, and styrene-acrylonitrile.

In some embodiments, the polymer matrix comprises one type of a polymer. In other embodiments, the polymer matrix comprises one or more types of polymers.

In some embodiments, the APM comprises one or more polymers that have a polarizing filter. In some embodiments, the APM comprises one or more polymer types selected from the group consisting of polyethylene terephthalate (PET), polyester, nylon, rayon, and spandex. In some embodiments, the polymer matrix is PET.

In some embodiments, the polymer matrix may contain additives such as coloring agent, surface stabilizer, surfactants, UV stabilizers, plasticizers, slip agents, mineral fillers, bonding agents, antistatic agents, oils, antioxidants, adhesives, and the like. In some embodiments the coloring agent affects the optical properties of said polymer.

Properties of Active Polymer Material

In some embodiments, the APM may absorb a light wave and emit a different wave. Thus in some embodiments, the APM may shorten the wavelength of the absorbed light. In other embodiments, the APM may lengthen the wavelength of the absorbed light, depending on the desired effect. In yet other embodiments the APM of the present invention may be designed to absorb a portion of the light spectrum and convert it to heat or other type of energy. In some embodiments the APM of the present invention may allow for the transmission of portions of the spectrum such that selected wavelengths are allowed to pass through the APM. In other embodiments the APM of the present invention may reflect selected portions of the light spectrum. In yet other embodiments, the APM may be designed to selectively polarize certain portions of the spectrum, either during transmission, or reflection of said waves.

In some embodiments, a combination of the mineral and the polymer matrix may result in the APM that emits light at a specific range. For example, in some embodiments, aluminum oxide promotes IR light lengthening. When said APM comprising aluminum oxide interacts with IR light, in some embodiments, the material releases light in a longer IR range than the range it absorbed.

Similarly, silicon dioxide has a unique property of interacting with UV light when combined with certain polymer matrices. In some embodiments, an APM comprising silicon dioxide may absorb one range of UV light but emit a UV light in shorter wavelengths.

In some embodiments, when more than one type of mineral is used to construct the APM, the material may exhibit synergistic optical properties of those different minerals.

In some embodiments, the mineral particles and the polymer matrix, independently, may have a light transmission in the range of about 200 nm to about 1100 nm. That is, the mineral particles and the polymer matrix, independently, may have a light transmission of about 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, 1000 nm, 1025 nm, 1050 nm, 1075 nm, and/or 1100 nm.

In some embodiments the mineral particles and the polymer matrix, independently, may have a light transmission in the range of about 200 nm to about 1100 nm. That is, the mineral particles and the polymer matrix, independently, may have a light transmission of in the range of about 200-250 nm, 250-300 nm, 300-350 nm, 350-400 nm, 400-450 nm, 450-500 nm, 500-550 nm, 550-600 nm, 600-650 nm, 650-700 nm, 700-750 nm, 750-800 nm, 800-850 nm, 850-900 nm, 900-950 nm, 950-1000 nm, 1000-1050 nm, and/or 1050-1100 nm.

In some embodiments, the mineral particles and the polymer matrix, independently, may absorb light in the range of about 10 nm to about 15000 nm.

In some embodiments, the mineral particles and the polymer matrix, independently, may absorb light in the range of about 10 nm to about 200 nm. That is, the mineral particles and the polymer matrix, independently, may absorb light at about 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, and/or 200 nm.

In some embodiments, the mineral particles and the polymer matrix, independently, may absorb light in the range of about 10 nm to about 200 nm. That is, the mineral particles and the polymer matrix, independently, may absorb light in the range of about 10-20 nm, 20-40 nm, 40-60 nm, 60-80 nm, 80-100 nm, 100-120 nm, 120-140 nm, 140-160 nm, 160-180 nm, and/or 180-200 nm.

In some embodiments, the mineral particles and the polymer matrix, independently, may absorb light in the range of about 200 nm to about 500 nm. That is, the mineral particles and the polymer matrix, independently, may absorb light at about 200 nm, 225 nm, 250 nm, 275 nm, 300 nm, 325 nm, 350 nm, 375 nm, 400 nm, 425 nm, 450 nm, 475 nm, and/or 500 nm.

In some embodiments, the mineral particles and the polymer matrix, independently, may absorb light in the range of about 200 nm to about 500 nm. That is, the mineral particles and the polymer matrix, independently, may absorb light in the range of about 200-250 nm, 250-300 nm, 300-350 nm, 350-400 nm, 400-450 nm, and/or 450-500 nm.

In some embodiments, the mineral particles and the polymer matrix, independently, may absorb light in the range of about 500 nm to about 1100 nm. That is, the mineral particles and the polymer matrix, independently, may absorb light at about 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, 1000 nm, 1025 nm, 1050 nm, 1075 nm, and/or 1100 nm.

In some embodiments, the mineral particles and the polymer matrix, independently, may absorb light in the range of about 500 nm to about 1100 nm. That is, the mineral particles and the polymer matrix, independently, may absorb light in the range of about 500-550 nm, 550-600 nm, 600-650 nm, 650-700 nm, 700-750 nm, 750-800 nm, 800-850 nm, 850-900 nm, 900-950 nm, 950-1000 nm, 1000-1050 nm, and/or 1050-1100 nm.

In some embodiments, the mineral particles and the polymer matrix, independently, may absorb light in the range of about 1100 nm to about 15000 nm. That is, the mineral particles and the polymer matrix, independently, may absorb light at about 1100 nm, 1200 nm, 1300 nm, 1400 nm, 1500 nm, 1600 nm, 1700 nm, 1800 nm, 1900 nm, 2000 nm, 2100 nm, 2200 nm, 2300 nm, 2400 nm, 2500 nm, 2600 nm, 2700 nm, 2800 nm, 2900 nm, 3000 nm, 3100 nm, 3200 nm, 3300 nm, 3400 nm, 3500 nm, 3600 nm, 3700 nm, 3800 nm, 3900 nm, 4000 nm, 4100 nm, 4200 nm, 4300 nm, 4400 nm, 4500 nm, 4600 nm, 4700 nm, 4800 nm, 4900 nm, 5000 nm, 5100 nm, 5200 nm, 5300 nm, 5400 nm, 5500 nm, 5600 nm, 5700 nm, 5800 nm, 5900 nm, 6000 nm, 6100 nm, 6200 nm, 6300 nm, 6400 nm, 6500 nm, 6600 nm, 6700 nm, 6800 nm, 6900 nm, 7000 nm, 7100 nm, 7200 nm, 7300 nm, 7400 nm, 7500 nm, 7600 nm, 7700 nm, 7800 nm, 7900 nm, 8000 nm, 8100 nm, 8200 nm, 8300 nm, 8400 nm, 8500 nm, 8600 nm, 8700 nm, 8800 nm, 8900 nm, 9000 nm, 9100 nm, 9200 nm, 9300 nm, 9400 nm, 9500 nm, 9600 nm, 9700 nm, 9800 nm, 9900 nm, 10000 nm, 10100 nm, 10200 nm, 10300 nm, 10400 nm, 10500 nm, 10600 nm, 10700 nm, 10800 nm, 10900 nm, 11000 nm, 11100 nm, 11200 nm, 11300 nm, 11400 nm, 11500 nm, 11600 nm, 11700 nm, 11800 nm, 11900 nm, 12000 nm, 12100 nm, 12200 nm, 12300 nm, 12400 nm, 12500 nm, 12600 nm, 12700 nm, 12800 nm, 12900 nm, 13000 nm, 13100 nm, 13200 nm, 13300 nm, 13400 nm, 13500 nm, 13600 nm, 13700 nm, 13800 nm, 13900 nm, 14000 nm, 14100 nm, 14200 nm, 14300 nm, 14400 nm, 14500 nm, 14600 nm, 14700 nm, 14800 nm, 14900 nm, and/or 15000 nm.

In some embodiments, the mineral particles and the polymer matrix, independently, may absorb light in the range of about 1100 nm to about 15000 nm. That is, the mineral particles in the mineral powder may absorb light in the range of about 1100-1200 nm, 1200-1400 nm, 1400-1600 nm, 1600-1800 nm, 1800-2000 nm, 2000-2200 nm, 2200-2400 nm, 2400-2600 nm, 2600-2800 nm, 2800-3000 nm, 3000-3200 nm, 3200-3400 nm, 3400-3600 nm, 3600-3800 nm, 3800-4000 nm, 4000-4200 nm, 4200-4400 nm, 4400-4600 nm, 4600-4800 nm, 4800-5000 nm, 5000-5200 nm, 5200-5400 nm, 5400-5600 nm, 5600-5800 nm, 5800-6000 nm, 6000-6200 nm, 6200-6400 nm, 6400-6600 nm, 6600-6800 nm, 6800-7000 nm, 7000-7200 nm, 7200-7400 nm, 7400-7600 nm, 7600-7800 nm, 7800-8000 nm, 8000-8200 nm, 8200-8400 nm, 8400-8600 nm, 8600-8800 nm, 8800-9000 nm, 9000-9200 nm, 9200-9400 nm, 9400-9600 nm, 9600-9800 nm, 9800-10000 nm, 10000-10200 nm, 10200-10400 nm, 10400-10600 nm, 10600-10800 nm, 10800-11000 nm, 11000-11200 nm, 11200-11400 nm, 11400-11600 nm, 11600-11800 nm, 11800-12000 nm, 12000-12200 nm, 12200-12400 nm, 12400-12600 nm, 12600-12800 nm, 12800-13000 nm, 13000-13200 nm, 13200-13400 nm, 13400-13600 nm, 13600-13800 nm, 13800-14000 nm, 14000-14200 nm, 14200-14400 nm, 14400-14600 nm, 14600-14800 nm, and/or 14800-15000 nm.

In some embodiments, the mineral particles and the polymer matrix, independently, may polarize light in the range of about 200 nm to about 15000 nm.

In some embodiments, the mineral particles and the polymer matrix, independently, may polarize light in the range of about 200 nm to about 500 nm. That is, the mineral particles and the polymer matrix, independently, may polarize light at about 200 nm, 225 nm, 250 nm, 275 nm, 300 nm, 325 nm, 350 nm, 375 nm, 400 nm, 425 nm, 450 nm, 475 nm, and/or 500 nm.

In some embodiments, the mineral particles and the polymer matrix, independently, may polarize light in the range of about 200 nm to about 500 nm. That is, the mineral particles and the polymer matrix, independently, may polarize light in the range of about 200-250 nm, 250-300 nm, 300-350 nm, 350-400 nm, 400-450 nm, and/or 450-500 nm.

In some embodiments, the mineral particles and the polymer matrix, independently, may polarize light in the range of about 500 nm to about 1100 nm. That is, the mineral particles and the polymer matrix, independently, may polarize light at about 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, 1000 nm, 1025 nm, 1050 nm, 1075 nm, and/or 1100 nm.

In some embodiments, the mineral particles and the polymer matrix, independently, may polarize light in the range of about 500 nm to about 1100 nm. That is, the mineral particles and the polymer matrix, independently, may polarize light in the range of about 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, 1000 nm, 1025 nm, 1050 nm, 1075 nm, and/or 1100 nm.

In some embodiments, the mineral particles and the polymer matrix, independently, may polarize light in the range of about 1100 nm to about 15000 nm. That is, the mineral particles and the polymer matrix, independently, may polarize light at about 1100 nm, 1200 nm, 1300 nm, 1400 nm, 1500 nm, 1600 nm, 1700 nm, 1800 nm, 1900 nm, 2000 nm, 2100 nm, 2200 nm, 2300 nm, 2400 nm, 2500 nm, 2600 nm, 2700 nm, 2800 nm, 2900 nm, 3000 nm, 3100 nm, 3200 nm, 3300 nm, 3400 nm, 3500 nm, 3600 nm, 3700 nm, 3800 nm, 3900 nm, 4000 nm, 4100 nm, 4200 nm, 4300 nm, 4400 nm, 4500 nm, 4600 nm, 4700 nm, 4800 nm, 4900 nm, 5000 nm, 5100 nm, 5200 nm, 5300 nm, 5400 nm, 5500 nm, 5600 nm, 5700 nm, 5800 nm, 5900 nm, 6000 nm, 6100 nm, 6200 nm, 6300 nm, 6400 nm, 6500 nm, 6600 nm, 6700 nm, 6800 nm, 6900 nm, 7000 nm, 7100 nm, 7200 nm, 7300 nm, 7400 nm, 7500 nm, 7600 nm, 7700 nm, 7800 nm, 7900 nm, 8000 nm, 8100 nm, 8200 nm, 8300 nm, 8400 nm, 8500 nm, 8600 nm, 8700 nm, 8800 nm, 8900 nm, 9000 nm, 9100 nm, 9200 nm, 9300 nm, 9400 nm, 9500 nm, 9600 nm, 9700 nm, 9800 nm, 9900 nm, 10000 nm, 10100 nm, 10200 nm, 10300 nm, 10400 nm, 10500 nm, 10600 nm, 10700 nm, 10800 nm, 10900 nm, 11000 nm, 11100 nm, 11200 nm, 11300 nm, 11400 nm, 11500 nm, 11600 nm, 11700 nm, 11800 nm, 11900 nm, 12000 nm, 12100 nm, 12200 nm, 12300 nm, 12400 nm, 12500 nm, 12600 nm, 12700 nm, 12800 nm, 12900 nm, 13000 nm, 13100 nm, 13200 nm, 13300 nm, 13400 nm, 13500 nm, 13600 nm, 13700 nm, 13800 nm, 13900 nm, 14000 nm, 14100 nm, 14200 nm, 14300 nm, 14400 nm, 14500 nm, 14600 nm, 14700 nm, 14800 nm, 14900 nm, and or 15000 nm.

In some embodiments, the mineral particles and the polymer matrix, independently, may polarize light in the range of about 1100 nm to about 15000 nm. That is, the mineral particles and the polymer matrix, independently, may polarize light in the range of about 1100-1200 nm, 1200-1400 nm, 1400-1600 nm, 1600-1800 nm, 1800-2000 nm, 2000-2200 nm, 2200-2400 nm, 2400-2600 nm, 2600-2800 nm, 2800-3000 nm, 3000-3200 nm, 3200-3400 nm, 3400-3600 nm, 3600-3800 nm, 3800-4000 nm, 4000-4200 nm, 4200-4400 nm, 4400-4600 nm, 4600-4800 nm, 4800-5000 nm, 5000-5200 nm, 5200-5400 nm, 5400-5600 nm, 5600-5800 nm, 5800-6000 nm, 6000-6200 nm, 6200-6400 nm, 6400-6600 nm, 6600-6800 nm, 6800-7000 nm, 7000-7200 nm, 7200-7400 nm, 7400-7600 nm, 7600-7800 nm, 7800-8000 nm, 8000-8200 nm, 8200-8400 nm, 8400-8600 nm, 8600-8800 nm, 8800-9000 nm, 9000-9200 nm, 9200-9400 nm, 9400-9600 nm, 9600-9800 nm, 9800-10000 nm, 10000-10200 nm, 10200-10400 nm, 10400-10600 nm, 10600-10800 nm, 10800-11000 nm, 11000-11200 nm, 11200-11400 nm, 11400-11600 nm, 11600-11800 nm, 11800-12000 nm, 12000-12200 nm, 12200-12400 nm, 12400-12600 nm, 12600-12800 nm, 12800-13000 nm, 13000-13200 nm, 13200-13400 nm, 13400-13600 nm, 13600-13800 nm, 13800-14000 nm, 14000-14200 nm, 14200-14400 nm, 14400-14600 nm, 14600-14800 nm, and/or 14800-15000 nm.

In some embodiments, the mineral particles and the polymer matrix, independently, may polarize light completely. In other embodiments, the mineral particles and the polymer matrix, independently, may polarize light partially.

In some embodiments, the mineral particles and the polymer matrix, independently, may emit light in the range of about 200 nm to about 1100 nm. That is, the mineral particles in the mineral powder may emit light at about 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, 1000 nm, 1025 nm, 1050 nm, 1075 nm, and/or 1100 nm.

In some embodiments, the mineral particles and the polymer matrix, independently, may emit light in the range of about 200 nm to about 1100 nm. That is, the mineral particles and the polymer matrix, independently, may emit light in the range of about 200-250 nm, 250-300 nm, 300-350 nm, 350-400 nm, 400-450 nm, 450-500 nm, 500-550 nm, 550-600 nm, 600-650 nm, 650-700 nm, 700-750 nm, 750-800 nm, 800-850 nm, 850-900 nm, 900-950 nm, 950-1000 nm, 1000-1050 nm, and/or 1050-1100 nm.

Active Polymer Material Manufacturing

Once the polymer matrix is chosen and the mineral is selected and ground into a powder of desired size and shape, the active polymer material is constructed. In some embodiments, the mineral powder may be dispersed, suspended, embedded, or otherwise incorporated into the polymer matrix by methods known in the art, such as in a rotating drum with paddle-type mixers. In other embodiments, the mineral powder may be introduced to the polymer matrix by other processes known in the art such as compounding. The examples of the process of grinding and combining can be found in U.S. Pat. Nos. 6,204,317, 6,214,264, and 6,218,007.

In some embodiments, the polymer matrix may initially be in pellet form and dried to remove moisture by using, for example, a desiccant dryer. In some embodiments, heating or cooling may be necessary prior and/or during the steps of dispersing, suspending, embedding, or incorporating the mineral to obtain an even dispersion.

In some embodiments, once the mineral is dispersed in the polymer matrix, the resulting active polymer material may be cured or hardened.

In some embodiments, the mineral comprise about 0.5% to about 20% of the active polymer material. That is, the mineral may comprise about 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5% or 20% of the active polymer material.

In some embodiments, the mineral comprise from about 0.5% to about 20% of the active polymer material. That is, the mineral may comprise in the range of about 0.5-1.0%, 1.0-1.5%, 1.5-2.0%, 2.0-2.5%, 2.5-3.0%, 3.0-4.0%, 4.0-5.0%, 5.0-6.0%, 6.0-7.0%, 7.0-8.0%, 8.0-9.0%, 9.0-10.0%, 10.0-11.0%, 11.0-12.0%, 12.0-13.0%, 13.0-14.0%, 14.0-15.0%, 15.0-16.0%, 16.0-17.0%, 17.0-18.0%, 18.0-19.0%, or 19.0-20% of the active polymer material.

In some embodiments, the active polymer material is Celliant® (U.S. Pat. No. 7,074,499).

Manipulation of Active Polymer Material

The APM described herein can be manipulated into different forms depending on the application requirements. In some embodiments, the APM can be formed into useful building blocks such as fibers or films. In other embodiments, the APM is formed into small beads or particles having an average size of less than about 5 cm, less than about 1 cm, or less than about 0.5 cm.

Once the mineral powder and the polymer matrix are combined, the resulting liquid, viscous oil, or semi-solid may be extruded into various shapes and forms. In some embodiments, the APM is extruded into a fiber. In other embodiments, the APM is extruded into staple fibers of various lengths. The examples of this process of extrusion, known in the art, can be found in previously disclosed references and in U.S. Pat. No. 6,067,785.

In some embodiments, once the active polymer material is extruded into various forms, it may need to be dried, cured, and/or hardened.

Once the polymer material system is extruded into a fiber form, in some embodiments, the fibers may be combined together by a spinning process, for example using a rotary spinning machine, to yield a yarn. The range of the size of the apertures in the rotary spinning machine may be from about 6 microns to about 30 microns.

In some embodiments, the step of spinning the fibers into a yarn comprises spinning staple fiber having a denier per fiber of between about 1 and about 3; accordingly, the prior step of spinning the melted polyester into fiber likewise comprises forming a fiber of those dimensions. The fiber is typically heat set before being cut into staple fibers with conventional techniques. While the extruded fibers are solidifying, they may be drawn by methods known in the art to impart strength.

In some embodiments, yarn made of the APM is further formed into fabrics or textiles, typically woven or knitted fabrics by combination with both natural and synthetic fibers. Non-limiting examples of natural fibers may include cotton, wool, hemp, silk, ramie, and jute. Non-limiting examples of synthetic fibers may include acrylic, acetate, Lycra®, spandex, polyester, nylon, and rayon.

In some embodiments, yarn made of the APM is dyed. In other embodiments, the fabric or textile made of the APM comprising yarn may be dyed. Dyes can be synthetic or natural. Non-limiting examples of the types of dyes include direct, acid, disperse, reactive, basic, mordant, sulfur and vat dyes.

In some embodiments, yarn made of the APM is incorporated into blends with cotton and polyester in any proportion. In some embodiments, the blend includes between about 35% and about 65% by weight of cotton with the remainder being polyester. That is, said blend may be about 35/65 (35% by weight of cotton and 65% by weight of polyester), 36/64, 37/63, 38/62, 39/61, 40/60, 41/59, 42/58, 43/57, 44/56, 45/55, 46/54, 47/53, 48/52, 49/51, 50/50, 51/49, 52/48, 53/47, 54/46, 55/45, 56/44, 57/43, 58/42, 59/41, 60/40, 61/39, 62/38, 63/37, 64/36, or 65/35.

In some embodiments, yarn made of the APM is incorporated into blends with cotton and polyester of 50% cotton and 50% polyester (50/50).

In some embodiments, the APM can be produced into different fibers. Other methods of production of fibers are equally suitable such as those described in U.S. Pat. Nos. 3,341,512; 3,377,129; 4,666,454; 4,975,233; 5,008,230; 5,091,504; 5,135,697; 5,272,246; 4,270,913; 4,384,450; 4,466,237; 4,113,794; and 5,694,754, all of which are expressly incorporated by reference in their entirety herein.

In some embodiments, the APM is extruded into a staple fiber with a length in the range of about 0.1 cm to 15 cm. That is, the staple fiber may be about 0.1 cm, 0.2 cm, 0.3 cm, 0.4 cm, 0.5 cm, 0.6 cm, 0.7 cm, 0.8 cm, 0.9 cm, 1.0 cm, 1.1 cm, 1.2 cm, 1.3 cm, 1.4 cm, 1.5 cm, 1.6 cm, 1.7 cm, 1.8 cm, 1.9 cm, 2.0 cm, 2.1 cm, 2.2 cm, 2.3 cm, 2.4 cm, 2.5 cm, 2.6 cm, 2.7 cm, 2.8 cm, 2.9 cm, 3.0 cm, 3.1 cm, 3.2 cm, 3.3 cm, 3.4 cm, 3.5 cm, 3.6 cm, 3.7 cm, 3.8 cm, 3.9 cm, 4.0 cm, 4.1 cm, 4.2 cm, 4.3 cm, 4.4 cm, 4.5 cm, 4.6 cm, 4.7 cm, 4.8 cm, 4.9 cm, 5.0 cm, 5.1 cm, 5.2 cm, 5.3 cm, 5.4 cm, 5.5 cm, 5.6 cm, 5.7 cm, 5.8 cm, 5.9 cm, 6.0 cm, 6.1 cm, 6.2 cm, 6.3 cm, 6.4 cm, 6.5 cm, 6.6 cm, 6.7 cm, 6.8 cm, 6.9 cm, 7.0 cm, 7.1 cm, 7.2 cm, 7.3 cm, 7.4 cm, 7.5 cm, 7.6 cm, 7.7 cm, 7.8 cm, 7.9 cm, 8.0 cm, 8.1 cm, 8.2 cm, 8.3 cm, 8.4 cm, 8.5 cm, 8.6 cm, 8.7 cm, 8.8 cm, 8.9 cm, 9.0 cm, 9.1 cm, 9.2 cm, 9.3 cm, 9.4 cm, 9.5 cm, 9.6 cm, 9.7 cm, 9.8 cm, 9.9 cm, 10.0 cm, 10.1 cm, 10.2 cm, 10.3 cm, 10.4 cm, 10.5 cm, 10.6 cm, 10.7 cm, 10.8 cm, 10.9 cm, 11.0 cm, 11.1 cm, 11.2 cm, 11.3 cm, 11.4 cm, 11.5 cm, 11.6 cm, 11.7 cm, 11.8 cm, 11.9 cm, 12.0 cm, 12.1 cm, 12.2 cm, 12.3 cm, 12.4 cm, 12.5 cm, 12.6 cm, 12.7 cm, 12.8 cm, 12.9 cm, 13.0 cm, 13.1 cm, 13.2 cm, 13.3 cm, 13.4 cm, 13.5 cm, 13.6 cm, 13.7 cm, 13.8 cm, 13.9 cm, 14.0 cm, 14.1 cm, 14.2 cm, 14.3 cm, 14.4 cm, 14.5 cm, 14.6 cm, 14.7 cm, 14.8 cm, 14.9 cm, or 15.0 cm.

Figure 8:
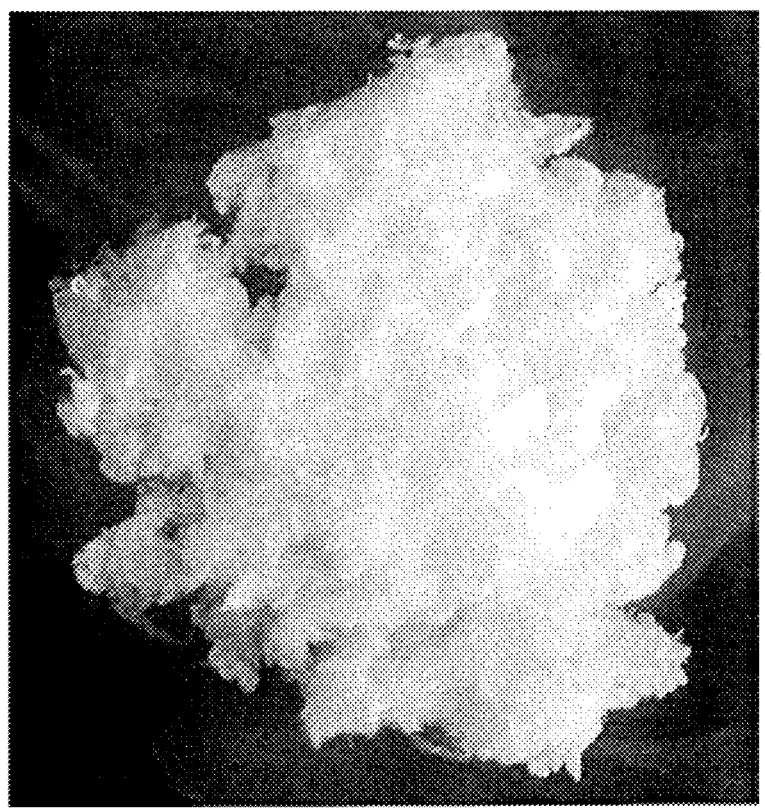
FIG. 8 is a picture of the active polymer material which was extruded as a staple fiber that was non-woven into a batting material.

In some embodiments, the polyester mixture may be used to create a staple fiber. The staple fiber may then be used to create a non-woven membrane. This membrane may be bonded to another fabric, membrane, or material. In some embodiments, staple fibers made from APM can be non-woven into a batting material (FIG. 8).

In some embodiments, the APM is extruded into a film with a thickness in the range of about 0.05 mm to 1.00 mm. That is, the film extruded from the APM may have a thickness of about 0.05 mm, 0.06 mm, 0.07 mm, 0.08 mm, 0.09 mm, 0.10 mm, 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm, 0.25 mm, 0.26 mm, 0.27 mm, 0.28 mm, 0.29 mm, 0.30 mm, 0.31 mm, 0.32 mm, 0.33 mm, 0.34 mm, 0.35 mm, 0.36 mm, 0.37 mm, 0.38 mm, 0.39 mm, 0.40 mm, 0.41 mm, 0.42 mm, 0.43 mm, 0.44 mm, 0.45 mm, 0.46 mm, 0.47 mm, 0.48 mm, 0.49 mm, 0.50 mm, 0.51 mm, 0.52 mm, 0.53 mm, 0.54 mm, 0.55 mm, 0.56 mm, 0.57 mm, 0.58 mm, 0.59 mm, 0.60 mm, 0.61 mm, 0.62 mm, 0.63 mm, 0.64 mm, 0.65 mm, 0.66 mm, 0.67 mm, 0.68 mm, 0.69 mm, 0.70 mm, 0.71 mm, 0.72 mm, 0.73 mm, 0.74 mm, 0.75 mm, 0.76 mm, 0.77 mm, 0.78 mm, 0.79 mm, 0.80 mm, 0.81 mm, 0.82 mm, 0.83 mm, 0.84 mm, 0.85 mm, 0.86 mm, 0.87 mm, 0.88 mm, 0.89 mm, 0.90 mm, 0.91 mm, 0.92 mm, 0.93 mm, 0.94 mm, 0.95 mm, 0.96 mm, 0.97 mm, 0.98 mm, 0.99 mm, or 1.00 mm.

In some embodiments, the APM is extruded into a film with a thickness in the range of about 0.05 mm to 0.5 mm. That is, the film extruded from the active polymer material may have a thickness in the range of about 0.05-0.06 mm, 0.06-0.08 mm, 0.09-0.10 mm, 0.10-0.12 mm, 0.12-0.14 mm, 0.14-0.16 mm, 0.16-0.18 mm, 0.18-0.20 mm, 0.20-0.22 mm, 0.22-0.24 mm, 0.24-0.26 mm, 0.26-0.28 mm, 0.28-0.30 mm, 0.30-0.32 mm, 0.32-0.34 mm, 0.34-0.36 mm, 0.36-0.38 mm, 0.38-0.40 mm, 0.40-0.42 mm, 0.42-0.44 mm, 0.44-0.46 mm, 0.46-0.48 mm, or 0.48-0.50 mm.

In some embodiments, the APM is extruded, woven, or non-woven into a sheet with a thickness in the range of about 1 mm to 100 mm. That is, the film extruded from the APM may have a thickness of about 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, 31 mm, 32 mm, 33 mm, 34 mm, 35 mm, 36 mm, 37 mm, 38 mm, 39 mm, 40 mm, 41 mm, 42 mm, 43 mm, 44 mm, 45 mm, 46 mm, 47 mm, 48 mm, 49 mm, 50 mm, 51 mm, 52 mm, 53 mm, 54 mm, 55 mm, 56 mm, 57 mm, 58 mm, 59 mm, 60 mm, 61 mm, 62 mm, 63 mm, 64 mm, 65 mm, 66 mm, 67 mm, 68 mm, 69 mm, 70 mm, 71 mm, 72 mm, 73 mm, 74 mm, 75 mm, 76 mm, 77 mm, 78 mm, 79 mm, 80 mm, 81 mm, 82 mm, 83 mm, 84 mm, 85 mm, 86 mm, 87 mm, 88 mm, 89 mm, 90 mm, 91 mm, 92 mm, 93 mm, 94 mm, 95 mm, 96 mm, 97 mm, 98 mm, 99 mm, or 100 mm.

Products Made from Active Polymer Material Useful in Agriculture

As described herein, the APM can be extruded into different types of fibers to form fabrics or textiles or it can be extruded into a film. These materials can then be transformed into various products that are useful in agricultural settings. In some embodiments, the APM is a solid. In another embodiment, the APM is a semi-solid.

In some embodiments, a fabric comprising the APM can be formed into a bag used to hold plants. The bag may, in some embodiments, hold the growth media and the plant. In some embodiments, the bag is meshed.

Standard plant bags, such as burlap or polypropylene bags, do not have the material that is capable of storing and emitting photons that may, in some embodiments, assist in plant growth.

In other embodiments, a fabric, a film, a sheet, a batting material, or a composition of staple fibers comprising the APM may be used to wrap the roots or roots and growth media surrounding the roots of a plant. In some embodiments, said fabric, film, or sheet may be meshed.

Figure 6:
FIG. 6 illustrates the use of a soil cover made with an active polymer material to grow plants according to the present invention.
Figure 7:
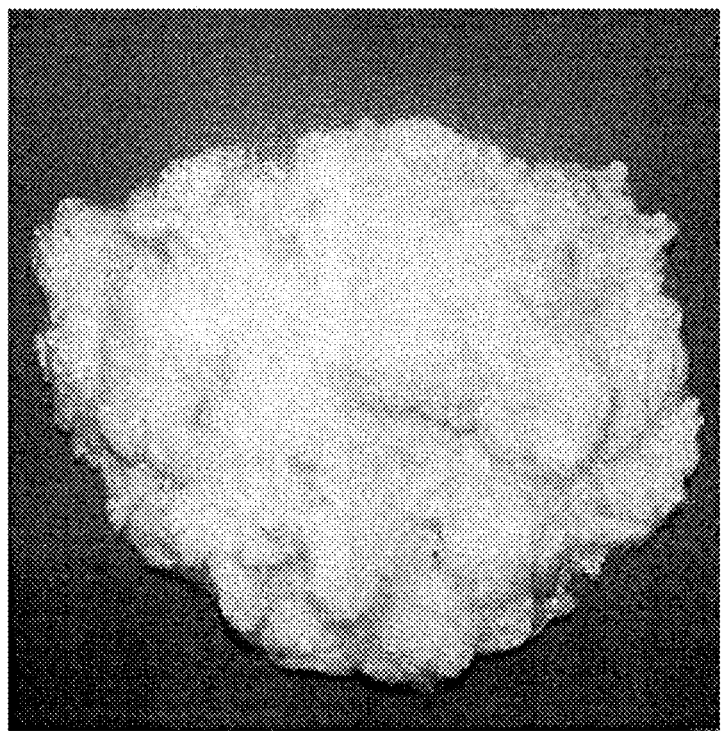
FIG. 7 is a picture of the active polymer material extruded as a staple fiber that was non-woven into a sphere-like shape.
Figure 9:
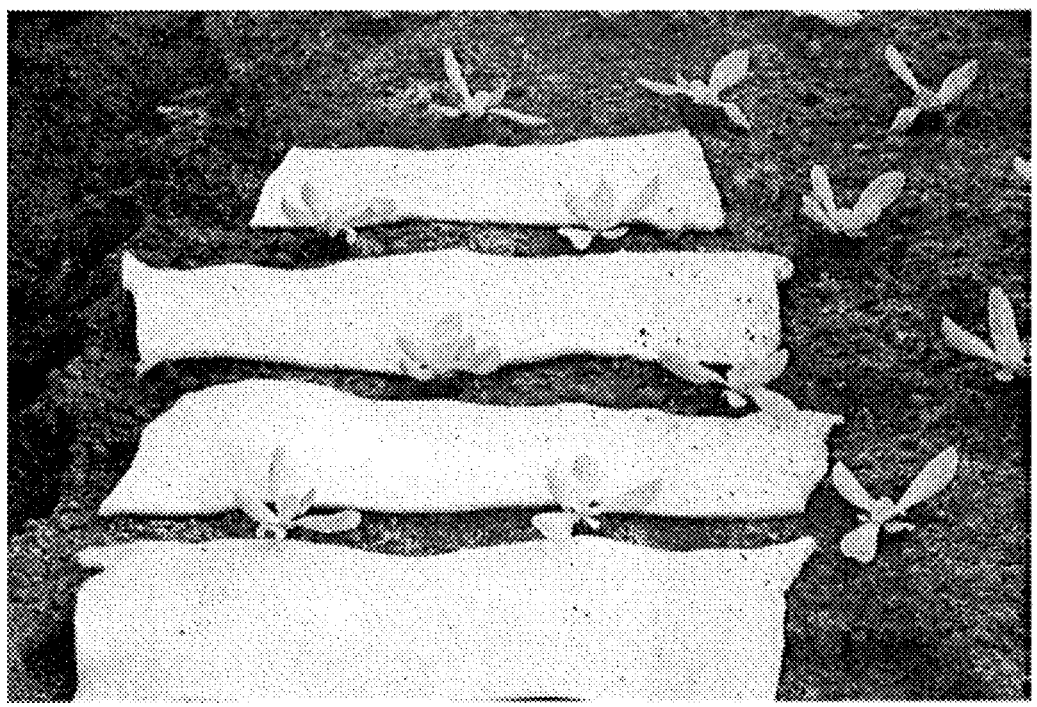
FIG. 9 is a picture of a sheet made with an active polymer material which is used as a soil cover.

In some embodiments the APMs of the present invention are used to produce soil covers (see FIGS. 2, 6, and 9). In some embodiments, a fabric, a film, a sheet, a batting material, and a composition of staple fibers comprising the APM may be placed on top of the soil. In other embodiments, said fabric, film, sheet, batting material or a composition of staple fibers may be placed on top of the soil and around the stem of the plant. In some embodiments, said fabric, film, or sheet may be meshed. In other embodiments, said fabric, film, or sheet may be cut to create an opening to accommodate the stem of the plant. In some embodiments, said fabric, film, or sheet may be meshed.

In some embodiments, the soil covers of the present invention warm the soil by trapping heat and/or transmitting IR radiation, mitigate weed growth by blocking visible light, and reflect light towards the plants for additional energy and warding off pests. In some embodiments the soil cover of the present invention is infused with pesticides, or other chemicals for additional protection of the plants (see for example U.S. Pat. Nos. 3,590,528; 7,247,311; 5,879,695; 5,532,298; and 8,142,804).

In some embodiments, the soil covers of the present invention are colored to further tailor the light absorption, transmission, and reflection beneficial for plant protection or growth (see for example U.S. Pat. Nos. 5,138,792 and 6,601,338).

In some embodiments, a fabric, a film, a sheet, a batting material, and a composition of staple fibers comprising the APM may be mixed into the growth media of the plant. In some embodiments, said fabric, film, or sheet may be cut into smaller pieces prior to mixing with the growth media. In some embodiments, said fabric, film, or sheet may be meshed.

In some embodiments, a fabric, a film, a sheet, a batting material, or a composition of staple fibers comprising the APM may be mixed with mulch. In some embodiments, said fabric, film, or sheet may be cut into smaller pieces prior to mixing with mulch. In some embodiments, said fabric, film, or sheet may be meshed.

Figures 4A, 4B:
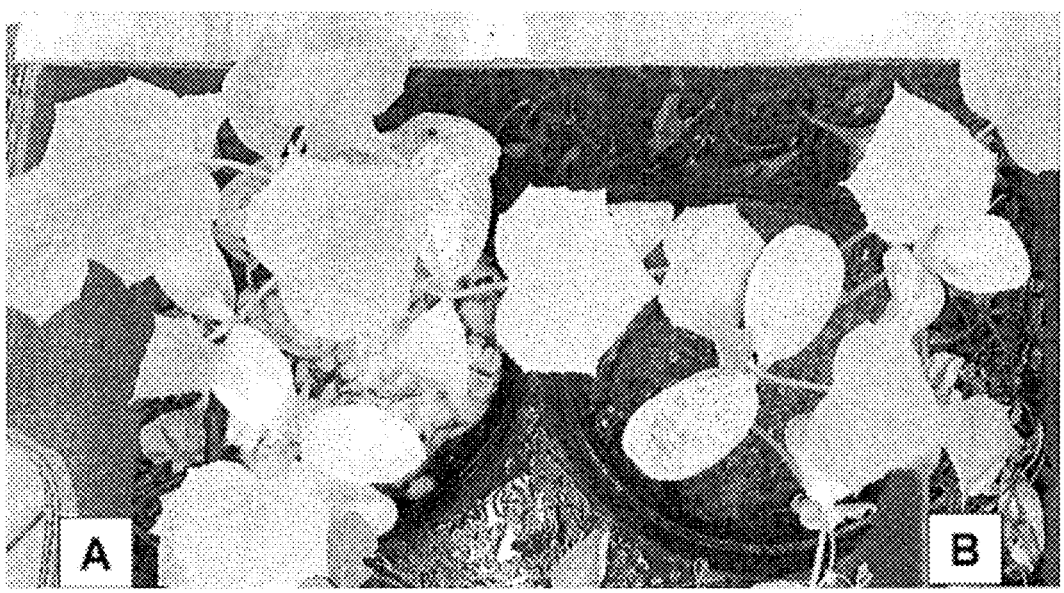
FIGS. 4A and 4B illustrate an example application of active polymer material as mulch FIG. 4A—A cucumber plant with active polymer mulch covering growth media.
Figure 10:
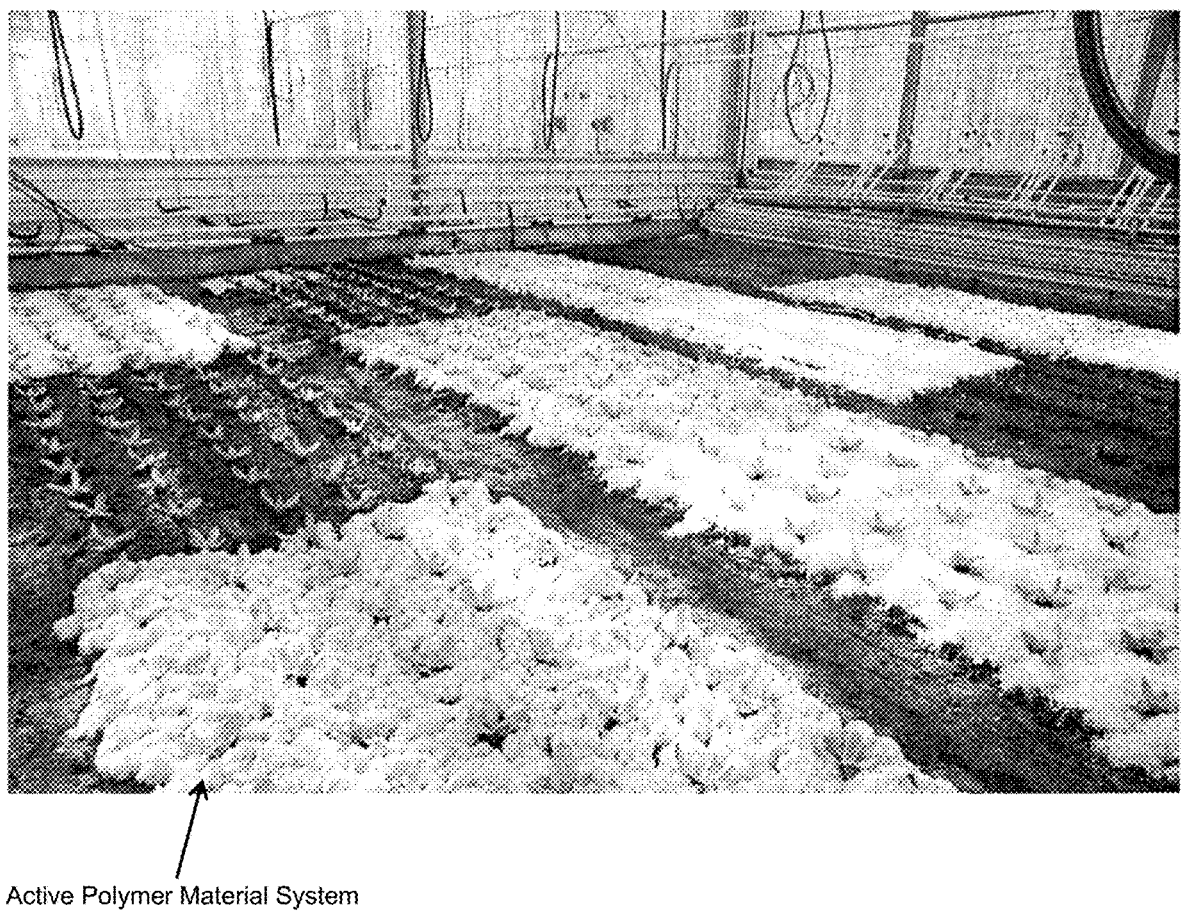
FIG. 10 is a picture of an active polymer material which is used in a soil cultivation study.
Figure 11:
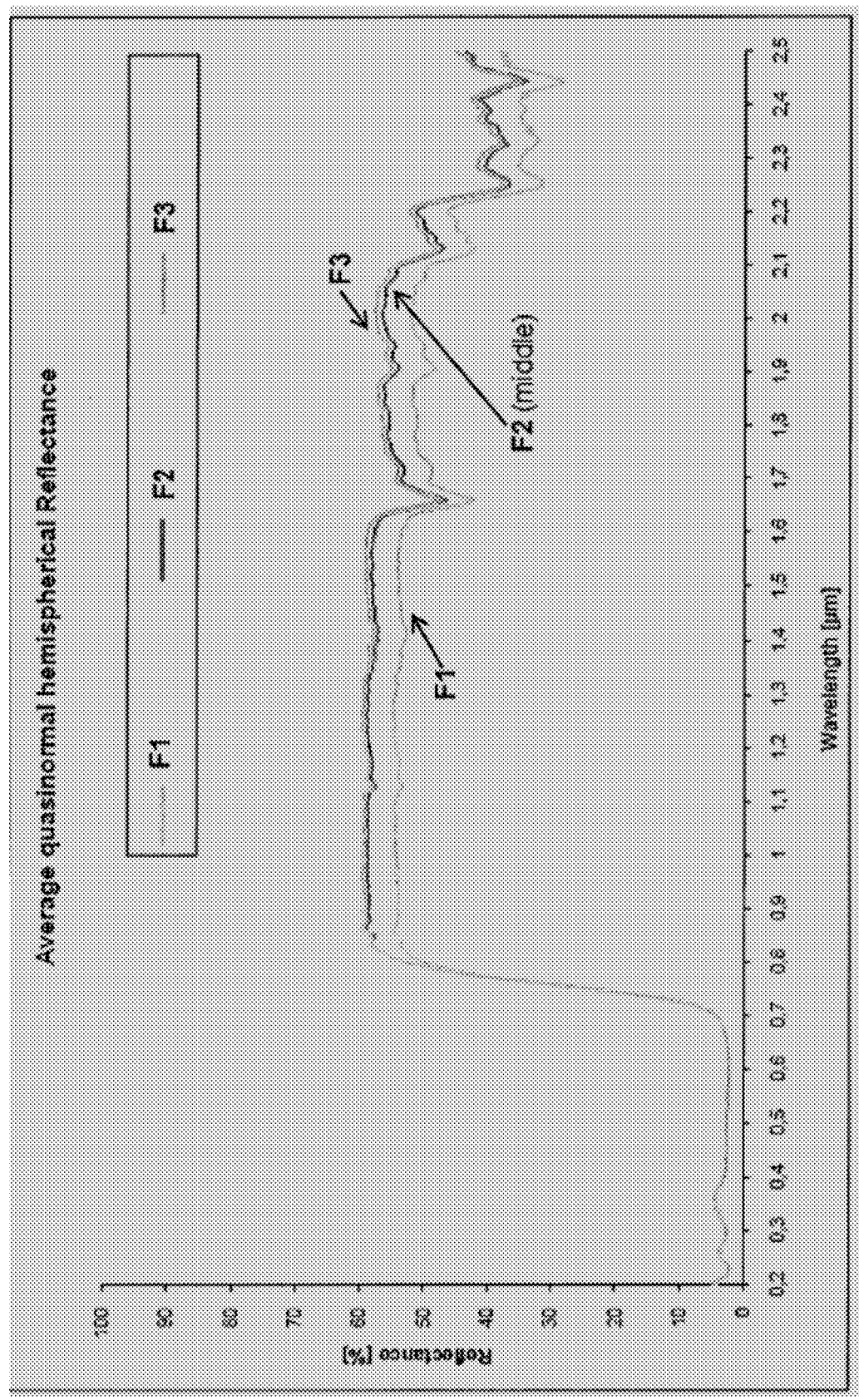
FIG. 11 is a reflectance spectrum on the wavelength range of 200 nm to 2500 nm (0.2 µm to 2.5 µm).
Figure 12:
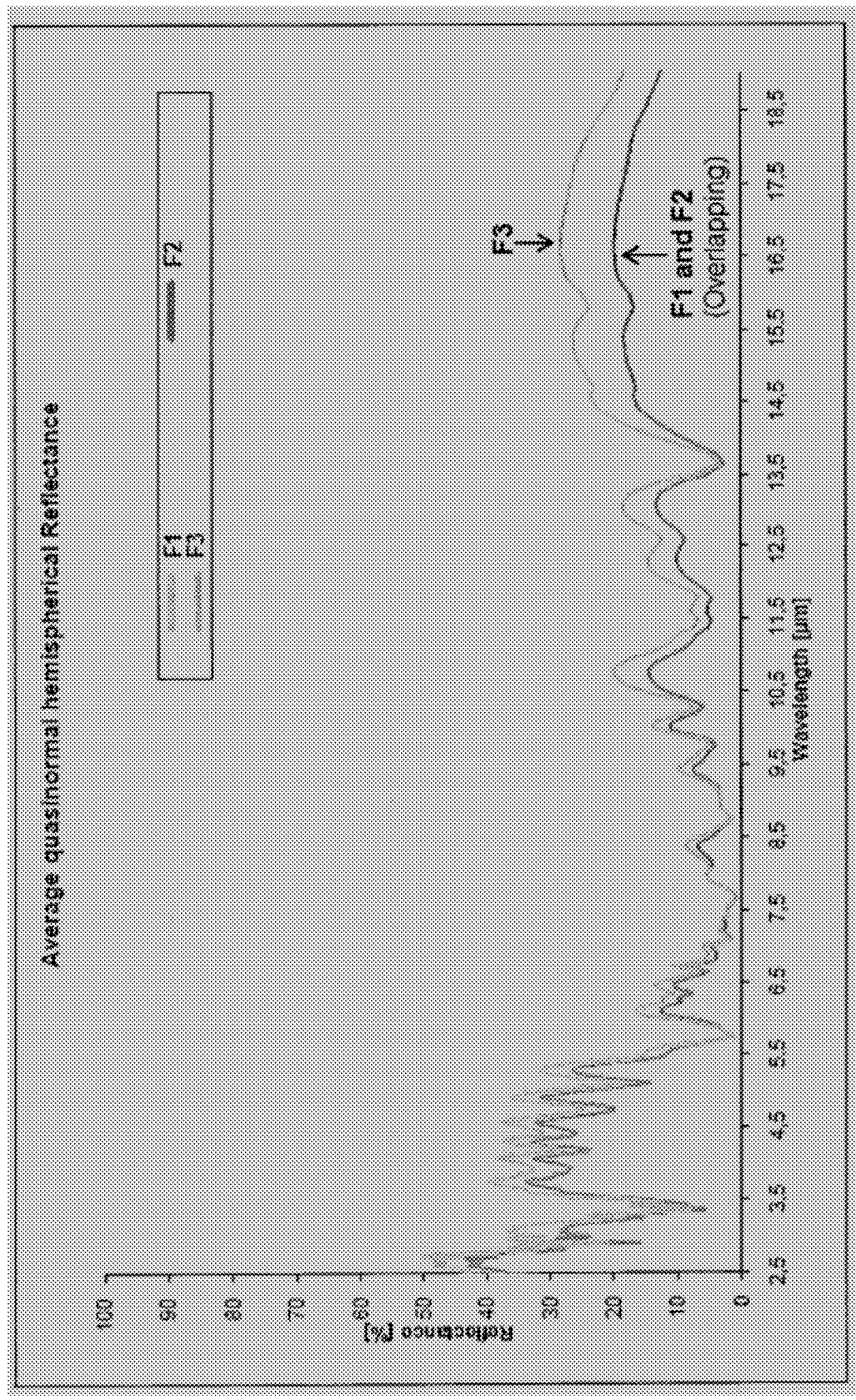
FIG. 12 is a reflectance spectrum on the wavelength range of 3000 nm to 19000 nm (3 µm to 19 µm).
Figure 13:
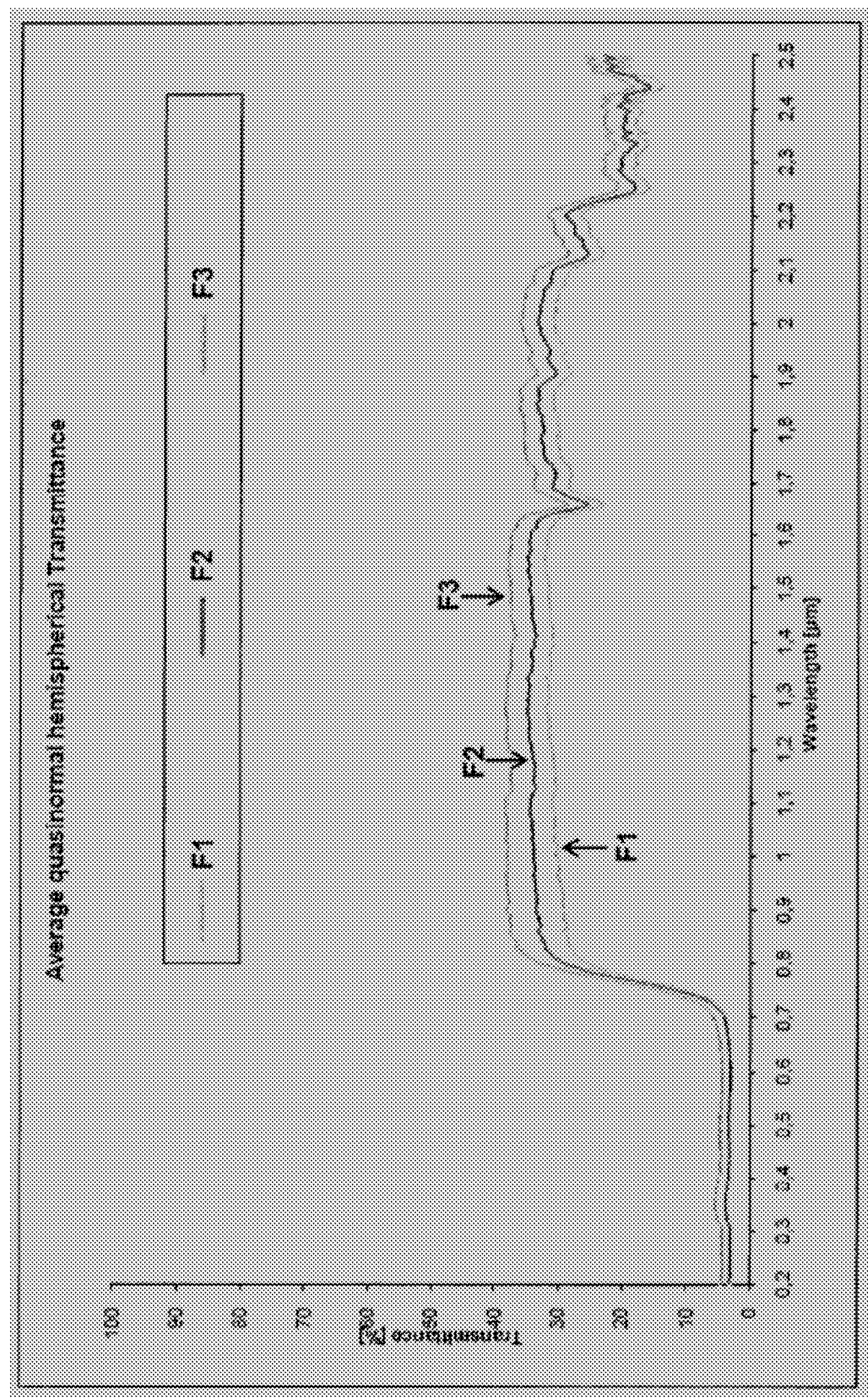
FIG. 13 is a transmittance spectrum on the wavelength range of 200 nm to 2500 nm (0.2 µm to 2.5 µm).
Figure 14:
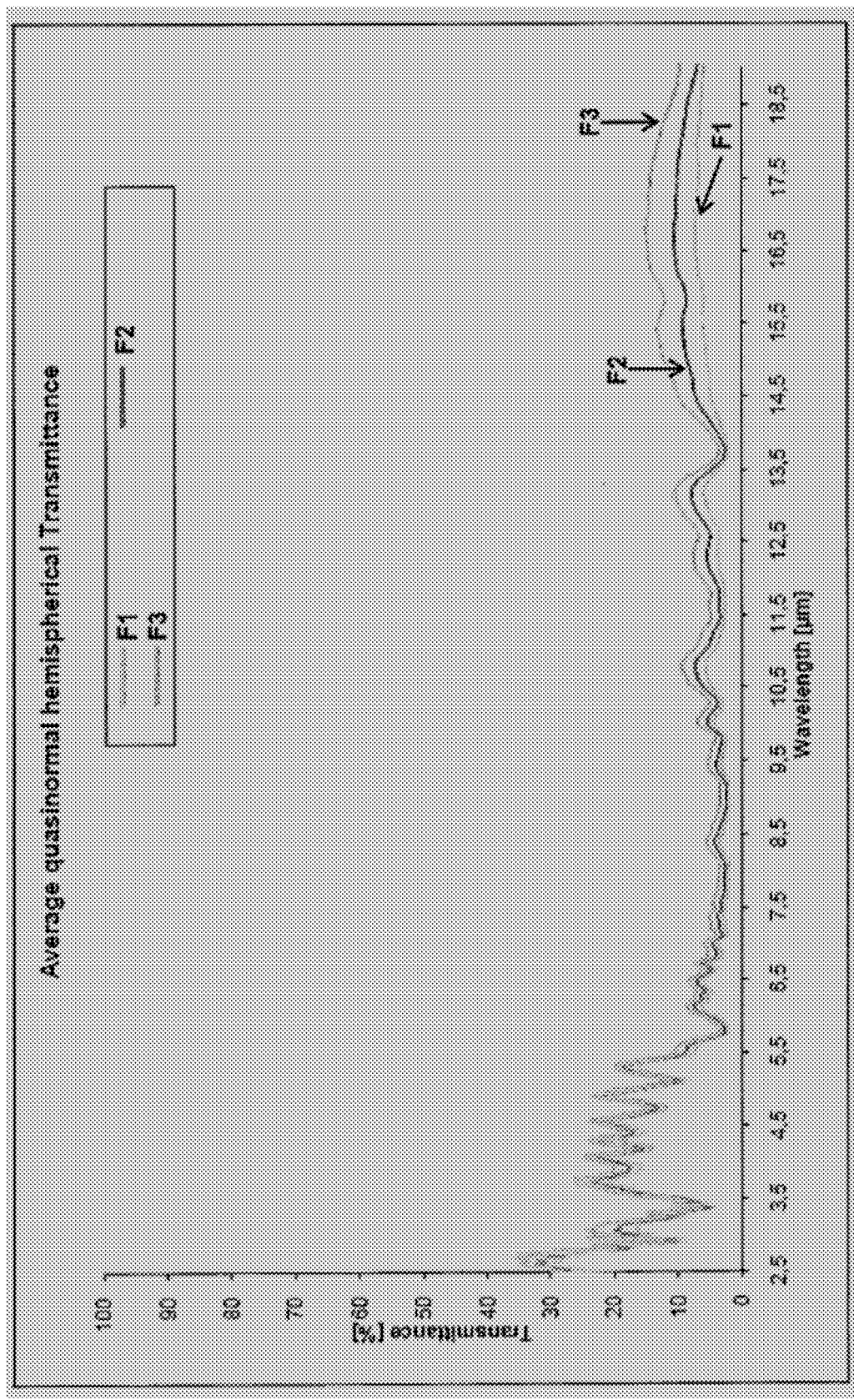
FIG. 14 is a transmittance spectrum on the wavelength range of 3000 nm to 19000 nm (3 µm to 19 µm).

In some embodiments, a fabric, a film, a sheet, a batting material, or a composition of staple fibers comprising the APM may be used as mulch (see FIGS. 4 and 10). In some embodiments, said fabric, film, or sheet may be cut into smaller pieces prior to use for said mulch. In some embodiments, said fabric, film, or sheet may be meshed.

Mulch act similarly to soil covers by retaining soil warmth and blocking sunlight to pass to the soil. In some embodiments, the APM mulch of the present invention may exhibit water and nutrient retaining properties (see for example U.S. Pat. Nos. 5,649,495; 5,868,087; and 7,459,501). In some embodiments, the water-retaining APM mulch of the present invention may be especially useful in dry climates. In some embodiments, the APM mulch of the present invention is processed into small particles such that it does not affect the soil composition as it swells when water is absorbed.

In some embodiments, a fabric, a film, or a sheet comprising the APM may be placed over the plant as a cover. In some embodiments, the cover may enclose the plant completely. In other embodiments, the cover may only provide partial coverage of the plant. In some embodiments, the cover may come in contact with the plant. In other embodiments, the cover may not be in contact with the plant. In some embodiments, said fabric, film, or sheet may be meshed.

In some embodiments, the APM of the present invention may be used to produce plant protectors. In some embodiments, a fabric, a film, or a sheet comprising the APM may be placed around the plant forming a cylindrical shape. In some embodiments, said fabric, film, or sheet may be placed around the plant forming an arch (i.e. not completely enclosed in a cylindrical shape). In some embodiments, said fabric, film, or sheet may be meshed. In some embodiments, said plant protector may be inflatable.

In some embodiments, a fabric, a batting material, or a composition of staple fibers comprising the APM may be used as the growth media for the plant (see FIG. 3). In other embodiments, said fabric, batting material, or composition of staple fibers may be used as a component in the growth media mixture.

In some embodiments, the APM may be chemically incorporated or embedded into planting pots and planting containers.

Non-Limiting Uses for Active Polymer Material

The APM that has been formed in various shapes as described previously can, in some embodiments, be placed in close proximity to a plant, a plant part, or a plant tissue culture. In some embodiments, said APM can be mixed in with the growth media of the plant. In other embodiments, said APM is the growth media of the plant.

In some embodiments, at least one part of the said APM is placed within 100 cm of the plant, plant part, or plant tissue culture. That is, at least one part of the said APM is placed at about 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, 30 cm, 31 cm, 32 cm, 33 cm, 34 cm, 35 cm, 36 cm, 37 cm, 38 cm, 39 cm, 40 cm, 41 cm, 42 cm, 43 cm, 44 cm, 45 cm, 46 cm, 47 cm, 48 cm, 49 cm, 50 cm, 51 cm, 52 cm, 53 cm, 54 cm, 55 cm, 56 cm, 57 cm, 58 cm, 59 cm, 60 cm, 61 cm, 62 cm, 63 cm, 64 cm, 65 cm, 66 cm, 67 cm, 68 cm, 69 cm, 70 cm, 71 cm, 72 cm, 73 cm, 74 cm, 75 cm, 76 cm, 77 cm, 78 cm, 79 cm, 80 cm, 81 cm, 82 cm, 83 cm, 84 cm, 85 cm, 86 cm, 87 cm, 88 cm, 89 cm, 90 cm, 91 cm, 92 cm, 93 cm, 94 cm, 95 cm, 96 cm, 97 cm, 98 cm, 99 cm, or 100 cm from a plant, a plant part, or a plant tissue culture.

In some embodiments, at least one part of the said APM touches the plant, plant part, or tissue culture.

In some embodiments, the APM can be reused. In other embodiments, the APM can be reused multiple times.

Once the APM is placed in close proximity to and/or touching the plant, normal care should ensure proper growth of the plant.

Active Polymer Material Kits

In some embodiments, the APM described previously can form a kit with another material that would benefit to be used in combination. Said kit may comprise the APM and a plant, a plant part, or a plant tissue culture. In some embodiments, said kit is a bagged or a potted plant. In some embodiments, said kit comprises seeds, bulbs, tubers, tuberous roots, rhizomes, and/or corms which are embedded or enclosed in said active polymer material.

In some embodiments, a kit may comprise the APM and a planting pot or a planting container. In some embodiments, said kit comprises the APM to be placed inside the planting pot or the planting container. In other embodiments, said kit comprises a planting pot or the planting container where the wall of said pot or container is lined with the APM.

In some embodiments, a kit may comprise the APM and plant growth media. Said kit may comprise plant growth media that is mixed in with APM. In other embodiments, said kit comprises the APM layered on or placed in between the plant growth media. In some embodiments, the kit may comprise the APM integrated into plant growth media in which a plant or a plant part, such as a plant seed, is placed or embedded.

EXAMPLES

Example 1: Formation of Active Polymer Material

The mineral particles of titanium dioxide, aluminum oxide, and silicon dioxide are ground to a fine powder in a composition of 10:2:10, respectively. The mineral powder composition (100 pounds) was mixed with PET resin (1000 pounds) in a heated rotating drum with paddle-type mixers. This produced active polymer material comprising about 1 percent of mineral by weight of the total weight of the active polymer material.

Example 2: Extruding Active Polymer Material into a Fiber

An active polymer material which was produced as described in Example 1, which is a viscous liquid, was passed through a spinneret to form continuous filaments of semi-solid material, which is then solidified upon cooling.

Example 3: Extruding Active Polymer Material into a Staple Fiber

An active polymer material fiber which was produced as described in Example 2 was cut in shorter uniform strands of about 3 cm to obtain staple fibers.

Example 4: Formation of Non-Woven Batting Material

A staple fiber made with an active polymer material, produced as described in Example 3, was combined together in a non-woven fashion to form a batting material.

Example 5: Formation of Non-Woven Batting Material in Spherical Shapes

A staple fiber made with an active polymer material, produced as described in Example 3, was combined together in a non-woven fashion and rolled to a spherical shape having a diameter of about 2 cm.

Example 6: Extruding Active Polymer Material into a Film

An active polymer material which was produced as described in Example 1, which is a viscous liquid, was passed through a plastic extruder to form a uniform and continuous thin film having thickness of about 0.5 mm.

Example 7: Comparison Study of Active Polymer Material

An active polymer material, comprising of Celliant®, was extruded into undyed polyester fibers (DTY 75/36) and knitted to form a fabric (100% APM). A controlled fabric was prepared by knitting undyed polyester fibers (DTY 75/36) which contained no APM (Control). The reflectance, transmittance, and absorptance properties of these fabrics were studied. The obtained data are shown in Table 1. The measurements were made in accordance with ASTM (American Society for Testing and Materials) standard test method E903, Solar Absorptance, Reflectance, and Transmittance of Material Using Integrating Spheres. The uncertainty in the measurement statistic is ±0.03 of a full-scale value of 1.0. The repeatability of the measurement statistic is ±0.005 of a full-scale value of 1.0. The instrument used was LPSR 200 IR (SN 108) by AZ Technology, Inc., with sphere geometry of absolute integrating sphere of 15°/h. The solar spectral irradiance distribution and the weighting method used for the computation of the solar optical property are in compliance with the standard as called out in paragraphs of section 8.3 of ASTM E903.

Table 1 illustrates that the fabric made with active polymer material system absorbs solar radiation in greater amount than the control fabric which contained no mineral compounds.

TABLE 1

| | Optical Properties: Full scale = 1.000 | | |
|---|---|---|---|
| Sample | Solar Reflectance at air mass 0 | Solar Transmittance at air mass 0 | Solar Absorptance at air mass 0 |
| 100% APM | 0.512 | 0.190 | 0.298 |
| Control | 0.610 | 0.214 | 0.176 |

Example 8: Comparison Study of Active Polymer Material

An active polymer material, comprising of Celliant®, was extruded into fibers, dyed in black, and knitted to form a fabric (100% APM, F1). The same active polymer material that was extruded into fibers and dyed in black was knitted with black polyester fibers in a 1:1 ratio (50% APM, F2). A controlled fabric was prepared by knitting black polyester fibers which contained no active polymer material (Control, F3). The reflectance, transmittance, and absorptance properties of the three fabrics were studied using the real solar spectrum, namely the incidental solar spectrum on the ground considering the atmospheric absorption. The obtained data are shown in Tables 2-4. The measurements were obtained using spectrometers (Perkin Elmer and Biorad) at an ambient temperature. The graphs depicting the results are presented in FIGS. 11-16.

The results in Tables 2-4 demonstrate that the largest optical property differences between the fabrics are in the interaction with the close IR spectrum. In particular, active polymer material (F1) demonstrates improved absorption of the close IR at 17.74% when compared to the control material (F3) of 5.79%.

TABLE 2

| Reflectance Study Results: % of the source which is reflected on the fabric | | | | |
|---|---|---|---|---|
| Sample | Total Reflectance | Reflectance [0.3-0.4 μm][1] UV range | Reflectance [0.4-0.78 μm][2] Visible range | Reflectance [0.78-2.2 μm][3] Close IR range |
| 100% APM (F1) | 20.41 | 3.98 | 5.56 | 53.08 |
| 50% APM (F2) | 21.81 | 3.92 | 5.77 | 57.08 |
| Control (F3) | 22.02 | 3.94 | 5.80 | 57.69 |

[1]300 nm-400 nm.
[2]400 nm-780 nm.
[3]780 nm-2200 nm.

TABLE 3

| Transmittance Study Results: % of the source which transmits through the fabric | | | | |
|---|---|---|---|---|
| Sample | Total Reflectance | Reflectance [0.3-0.4 μm][1] UV range | Reflectance [0.4-0.78 μm][2] Visible range | Reflectance [0.78-2.2 μm][3] Close IR range |
| 100% APM (F1) | 11.97 | 3.32 | 4.11 | 29.19 |
| 50% APM (F2) | 13.20 | 3.50 | 4.36 | 32.57 |
| Control (F3) | 15.53 | 5.09 | 5.94 | 36.52 |

[1]300 nm-400 nm.
[2]400 nm-780 nm.
[3]780 nm-2200 nm.

TABLE 4

| Absorptance Study Results: % of the source which is absorbed by the fabric | | | | |
|---|---|---|---|---|
| Sample | Total Reflectance | Reflectance [0.3-0.4 μm][1] UV range | Reflectance [0.4-0.78 μm][2] Visible range | Reflectance [0.78-2.2 μm][3] Close IR range |
| 100% APM (F1) | 67.92 | 92.70 | 90.34 | 17.74 |
| 50% APM (F2) | 64.99 | 92.58 | 89.87 | 10.36 |
| Control (F3) | 62.44 | 90.97 | 88.25 | 5.79 |

[1]300 nm-400 nm.
[2]400 nm-780 nm.
[3]780 nm-2200 nm.

These results demonstrate the effect of the active polymer materials of the present invention in altering specific light absorption, reflection, and transmittance properties. The Celliant® active mineral composition of 55% SiC, 25% $TiO_2$, 5% $SiO_2$, and 15% $Al_2O_3$ increases the absorption of IR range wavelengths. In some embodiment, this formulation of Celliant® demonstrates absorption and excitation of the solar radiation where 65% of the absorption is of the band in the infrared spectrum.

Example 9: Emittance Study of Active Polymer Material

An active polymer material, comprising of Celliant®, will be extruded into undyed polyester fibers (DTY 75/36) and knitted to form a fabric (100% APM). A controlled fabric will be prepared by knitting undyed polyester fibers (DTY 75/36) which contained no APM (Control). The emittance properties of these fabrics will be studied. The measurements will be made in accordance with AZ Technology test methods for near-normal emittance and total hemispherical emittance at 300 K. Near-normal emittance measurements are traceable to ASTM standard test method E408 through round robin testing with the Gier Dunkel DB-100. The instrument used will be TESA 2000 by AZ Technology, Inc., with absolute ellipsoidal cavity of 15°/h. Prior to each use, the instrument will be calibrated using Hemispheric Emittance Calibration Puck by AZ Technology, Inc.

Example 10: Formation of an EcoBag with a Plant

An active polymer material fiber which was produced as described in Example 2 was woven into a potting bag with an opening of about 10 cm diameter and a depth of about 15 cm. The bags of this example can be used as temporary or permanent growth containers.

Example 11: Formation of a Collar (Soil Cover)

An active polymer batting material which was produced as described in Example 4 was die-cut in a square shape having a dimension of 10×10 cm with a circular opening in the center of about 2 cm diameter (see FIG. 2). The die-cut material was then placed around the stem of the plant as shown in FIG. 6.

Example 12: Formation of a Mulch Made with the Active Polymer Material

An active polymer material staple fiber, having length of about 1 cm, produced as described in Example 3 was non-woven into a spherical shape of approximately 1 cm in diameter. The resulting non-woven spherical shaped materials were mixed in with the top layer of the soil surrounding a plant (see FIG. 4A).

Example 13: Formation of a Soil Cover

An active polymer material film which was produced as described in Example 6 was placed over a row of growth media. The film contained various opening to allow water permeation as well as to allow plant to grow.

Example 14: Comparison Study of Plant Growth of Bean Plants

Two separate plant containers were prepared. The experimental container was covered with 60 g/m$^2$ of surface area of APM batting material as a growth media (FIG. 3A) and the control container was covered with the same amount of non-APM batting material composed of the same polymer material but without the active mineral particles of the present invention (FIG. 3B). Bean seeds were placed in each container and were allowed to grow with regular watering. The temperature of the environment was between about 68° F. and about 80° F.

These results demonstrated that APM materials are able to enhance plant growth and development. The bean plants grown in the APM experimental container were taller, with greater number of leaves and increased branching (FIG. 3).

Figures 5A, 5B:
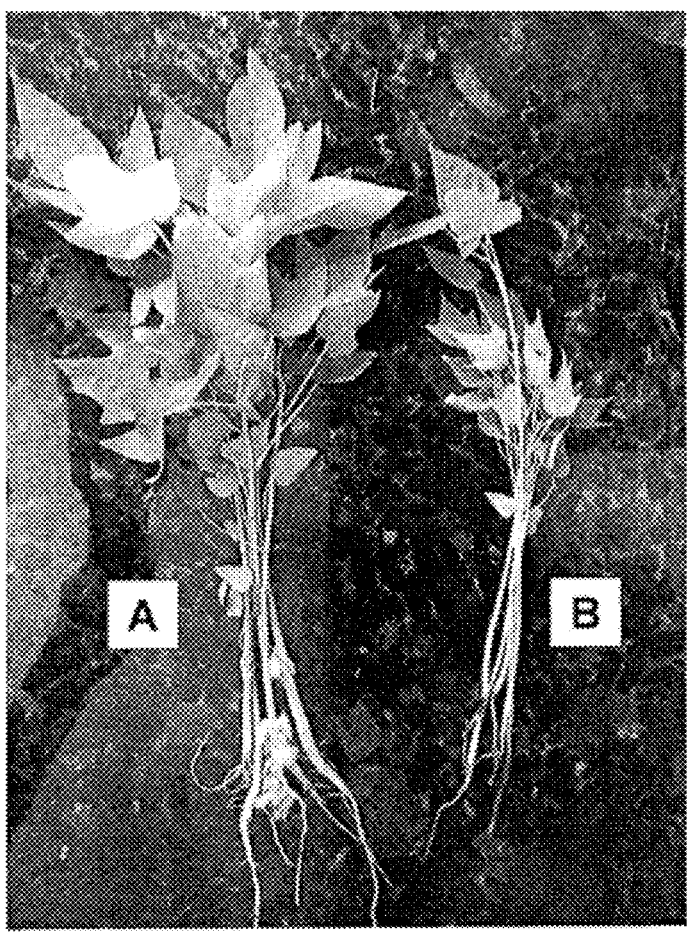
FIGS. 5A and 5B illustrate the improved growth characteristics of plants grown with active polymer material.

The growth enhancement of the APMs of the present invention was also observed in a variety of other plants. FIG. 5 demonstrates the difference it the growth of papaya plants grown with APM mulch (A) compared to papaya plants grown without APM mulch (B). Plants grown on the APM grew taller, grew wider in the stems, and also established longer root systems.

Example 15: Comparison Study of Plant Growth of Habanero Pepper Plants

Habanero pepper plants will be planted in identical 10-gallon pots with soil. The surface area of the soil in the experimental pot will be covered in an even layer of Celliant® active polymer material, while the control pot will be left uncovered. Both pots will be placed outside in direct sunlight for a full season. During this period, the temperature will likely to range from about 72° F. to about 88° F. Both planting pots will be treated equally and will be given the same amount and types of fertilizer and water regimen throughout the season. At the end of the growing season, both plants will be pulled and weighed for biomass.

Example 16: Propagation Trials for Fruits and Vegetables

Sweet peppers, tomatoes, and cucumber seeds were planted in the center of identical rockwool blocks (each 10×10 cm) and were covered with vermiculite. Forty-eight rockwool blocks of each plant species received an individual soil cover made with the APMs, specifically Celliant® 400 g/sm material ("Celliant® 400" treatment). Forty-eight rockwool blocks of each plant species received an individual soil cover made with the APMs differing in the amount of APMs compared to Celliant® 400 treatment, specifically Celliant® 600 g/sm material ("Celliant® 600" treatment). Forty-eight rockwool blocks of each plant species received an individual soil cover made with polyester, the same polymer material used in Celliant® 400 and 600 treatments but not containing the mineral compound, i.e. not an APM ("polyester" treatment). Forty-eight rockwool blocks of each plant species received no soil covers ("no soil cover" treatment). Each soil cover was 10×10 cm square with 25 mm hole in the middle for plant stem to grow.

After wetting, the seeded rockwool blocks prepared for all treatments were covered with plastic film for good germination conditions. Before the leaves shaded each other, the rockwool blocks were transplanted at random on the tables at a lower density. The rockwool blocks were placed in a climate controlled greenhouse with an ebb and flood system for irrigation and nutrition applications. All plants received the same treatments (water, nutrients, etc.). The greenhouse temperature was set at 25° C. all day or 20° C. during the day and 19° C. during the night, depending on the plants' growth needs and growth cycles.

The sweet pepper plants were grown for approximately 6-7 weeks (from sowing date). The tomato plants were grown for approximately 4-5 weeks. The cucumber plants were grown for approximately 2-3 weeks. During the study, the total number of germinated seeds, the number of leaves, fresh weight of leaves, leaf area, stem length, and fresh weight of the stem were measured. At the end of the propagation study, dry weight of the leaves and the stems were measured. In addition, during the propagation, water content (% WC), electrical conductivity level (EC) and the temperature (T) were measured in the rockwool blocks of the sweet pepper plants. The results of the plant measurements were analyzed with analysis of variance (Genstat) and with the Student test for pairwise comparisons of means (p=0.05).

Climate of the Propagation Study and Rockwool Block Measurements

The average day, night, and 24 hour temperature during the sweet peppers trial were 25.4, 22.6, and 24.2° C., respectively. The average humidity was 55%.

The water content fluctuated in all treatments for sweet peppers, but the average % WC was 83.1, 83.1, 82.6, 80.5% for Celliant® 400, Celliant® 600, polyester, and no soil cover treatments, respectively. The average EC-levels for the four treatments were 2.2, 2.2, 2.2, 2.4 ms/cm, respectively. The average temperature in the rockwool blocks for the four treatments were 26.4, 26.6, 26.6, 26.9° C., respectively.

Germination

The percentages of germinated seeds (48 seeds per treatment for each species) are shown in Table 5. Cucumber germinated at 100% under all treatment conditions. The differences in germination between four treatments were small.

TABLE 5

Percentage (%) of Germinated Seeds (48 seeds per treatment, per plant)

| Treatments | Sweet Pepper | Tomato | Cucumber |
|---|---|---|---|
| Celliant ® 400 | 94 | 98 | 100 |
| Celliant ® 600 | 92 | 98 | 100 |
| Polyester | 88 | 96 | 100 |
| No Soil Cover | 94 | 98 | 100 |

Destructive Measurements of Plants

At the end of the propagation study, ten representative plants from each treatment were evaluated in a destructive manner. These measurements were obtained on the $45^{th}$ day, $31^{st}$ day, and $17^{th}$ day since sowing for sweet peppers, tomatoes, and cucumbers, respectively. The average number of leaves per plant is shown in Table 6. For sweet peppers, both Celliant® 400 and 600 treatments resulted in more leaves than the two control experiments, polyester and no soil cover treatments.

TABLE 6

Average number of leaves per plant during propagation study (10 plants per treatment, per plant type)[1]

| Treatments | Sweet Pepper | Tomato | Cucumber |
|---|---|---|---|
| Celliant ® 400 | 35.0 b | 10.4 a | 6.0 a |
| Celliant ® 600 | 36.2 b | 10.2 a | 6.1 a |
| Polyester | 32.6 a | 10.6 a | 6.0 a |
| No Soil Cover | 28.4 a | 10.2 a | 6.0 a |
| Significance (p) | 0.02 | NS | NS |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.

The weights of fresh plants were also measured at the end of the cultivation period described above. Table 7 shows the average fresh weight. Sweet peppers demonstrated statistically significant weight increase with the use of Celliant® soil covers (Celliant® 400 and/or 600) when compared to treatment with no soil covers. Tomatoes demonstrated increase in fresh weight with Celliant® 400 and polyester treatments when compared with no soil cover treatment.

TABLE 7

Average fresh weight (g) per plant during propagation study (10 plants per treatment, per plant type)[1]

| Treatments | Sweet Pepper | Tomato | Cucumber |
|---|---|---|---|
| Celliant ® 400 | 80.4 c | 77.3 bc | 40.2 a |
| Celliant ® 600 | 79.6 bc | 69.6 ab | 39.2 a |
| Polyester | 71.1 b | 79.7 c | 35.2 a |
| No Soil Cover | 60.2 a | 61.0 a | 37.3 a |
| Significance (p) | <0.001 | 0.001 | NS |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.

The leaf areas were measured at the end of the cultivation period described above. Table 8 shows the average leaf areas. Sweet peppers demonstrated statistically significant increase in the leaf areas for all soil covers (Celliant® and polyester) when compared to treatment with no soil covers. Tomatoes demonstrated increase in leaf area with the Celliant® 400 and polyester treatments, when compared with no soil cover treatment.

TABLE 8

Average leaf areas ($cm^2$) per plant during propagation study (10 plants per treatment, per plant type)[1]

| Treatments | Sweet Pepper | Tomato | Cucumber |
|---|---|---|---|
| Celliant ® 400 | 2625 b | 2287 b | 1476 ab |
| Celliant ® 600 | 2568 b | 2183 ab | 1417 ab |
| Polyester | 2349 b | 2386 b | 1342 a |
| No Soil Cover | 1964 a | 1948 a | 1441 ab |
| Significance (p) | <0.001 | 0.005 | NS |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.

The stem lengths were measured at the end of the cultivation period described above. Table 9 shows the average leaf areas. Sweet peppers demonstrated statistically significant increase in stem lengths with use of Celliant® soil covers (Celliant® 400 and 600) when compared to the two controls, polyester and no soil cover treatments. Tomatoes demonstrated increase stem length with Celliant® 600 and polyester treatments, when compared with no soil cover treatment.

TABLE 9

Average stem lengths (cm) per plant during propagation study (10 plants per treatment, per plant type)[1]

| Treatments | Sweet Pepper | Tomato | Cucumber |
|---|---|---|---|
| Celliant ® 400 | 51.0 b | 68.4 ab | 35.1 a |
| Celliant ® 600 | 50.6 b | 73.0 c | 32.8 a |
| Polyester | 46.1 a | 71.7 bc | 32.0 a |
| No Soil Cover | 46.6 a | 67.7 a | 34.0 a |
| Significance (p) | 0.02 | 0.02 | NS |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.

The fresh weights of stems were measured at the end of the cultivation period described above. Table 10 shows the average leaf areas. Sweet peppers demonstrated statistically significant increase in fresh stem weights with use of Celliant® soil covers (Celliant® 400 and 600) when compared to the two controls, polyester and no soil cover treatments.

Tomatoes demonstrated increase fresh stem weights with the use of all three soil covers, when compared with no soil cover treatment.

TABLE 10

Average fresh stem weights (g) per plant during propagation study (10 plants per treatment, per plant type)[1]

| Treatments | Sweet Pepper | Tomato | Cucumber |
|---|---|---|---|
| Celliant ® 400 | 63.4 bc | 55.4 b | 17.6 b |
| Celliant ® 600 | 65.1 c | 56.4 b | 16.6 b |
| Polyester | 46.1 a | 71.7 bc | 32.0 a |
| No Soil Cover | 45.3 a | 48.0 a | 15.7 ab |
| Significance (p) | <0.001 | 0.002 | 0.02 |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.

After the fresh weight measurements were recorded, the plant parts were dried for 2 days at 80° C. After the drying process, the dry weight measurements were recorded. Table 11 shows the average dry weight of leaves. Sweet peppers demonstrated highest dry weight of leaves with Celliant 600 treatment, which was statistically different from both controls, polyester and no soil cover treatment. Tomatoes demonstrated increase in dry weight of the leaves with Celliant 400 and polyester treatments. Cucumbers showed increase in dry weight of the leaves for both Celliant® 400 and 600 treatments.

TABLE 11

Average dry weight of leaves (g) per plant during propagation study (10 plants per treatment, per plant type)[1]

| Treatments | Sweet Pepper | Tomato | Cucumber |
|---|---|---|---|
| Celliant ® 400 | 8.55 b | 8.31 b | 4.07 b |
| Celliant ® 600 | 10.10 c | 6.18 a | 3.80 b |
| Polyester | 7.89 b | 8.00 b | 3.18 a |
| No Soil Cover | 6.53 a | 5.17 a | 3.22 a |
| Significance (p) | <0.001 | <0.001 | <0.001 |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.

Table 12 shows the average dry weight of stems. Sweet peppers demonstrated highest dry weight of the stems with Celliant 600 treatment, which was statistically different from both controls, polyester and no soil cover treatments. Tomatoes demonstrated increase in dry weight of the stems with the use of soil covers (Celliant® and polyester) when compared to treatment with no soil covers. Cucumbers showed increase in dry weight of the stems for both Celliant soil covers (Celliant® 400 and 600).

TABLE 12

Average dry weight of stems (g) per plant during propagation study (10 plants per treatment, per plant type)[1]

| Treatments | Sweet Pepper | Tomato | Cucumber |
|---|---|---|---|
| Celliant ® 400 | 6.29 bc | 3.63 bc | 0.865 b |
| Celliant ® 600 | 7.24 c | 3.19 b | 0.785 b |
| Polyester | 5.36 ab | 3.85 c | 0.619 a |
| No Soil Cover | 4.39 a | 2.53 a | 0.689 a |
| Significance (p) | <0.001 | <0.001 | <0.001 |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.

While not wishing to be bound to any particular theory, we hypothesize that white colored plant covers may increase reflection of light back to the plant. This effect may be more obvious for plants that grow relatively slowly, such as sweet peppers and tomatoes. The rapid growth of the cucumbers may cover the surface of the rockwool blocks, which could have resulted in observation of less effect of the use of soil covers, when compared to sweet peppers and tomatoes.

Example 17: Cultivation Trials for Fruits and Vegetable

The remaining plants from the propagation trial as described in Example 16 were continued onto the cultivation trials. The cultivation trial included 10 plants each of tomatoes and cucumber and 12 plants of sweet peppers grown in greenhouse with the area of 144 m$^2$. High pressure sodium (HPS) lamps were switched on with a light intensity of 140 μmol/m$^2$/s on the 32$^{nd}$ day from beginning of the cultivation study for sweet peppers and tomatoes and on 25$^{th}$ day for cucumbers (from the day propagation experiment ended in Example 16). The maximum number of lighting hours a day was 14 hours.

The sweet pepper plants were grown for approximately 6-7 weeks (from sowing date). The tomato plants were grown for approximately 4-5 weeks. The cucumber plants were grown for approximately 2-3 weeks. During the study, the total number of germinated seeds, the number of leaves, fresh weight of leaves, leaf area, stem length, and fresh weight of the stem were measured. At the end of the propagation study, dry weight of the leaves and the stems were measured. In addition, during the propagation, water content (% WC), electrical conductivity level (EC) and the temperature (T) were measured in the rockwool blocks of the sweet pepper plants.

The start of the fruit production was observed approximately 8-9 weeks after the cultivation trial started for sweet peppers (total of ~14-15 weeks from sowing). The start of the fruit production for tomatoes was approximately 9-10 weeks after the start of the cultivation trial (total of ~13-14 weeks from sowing). The start of the fruit production for cucumber was approximately 3-4 weeks after the start of the cultivation trial (total of ~5-6 weeks from sowing). The final measurements were obtained at around week 14 since the beginning of the cultivation studies for sweet peppers, at around week 18 for tomatoes, and at around week 13 for cucumbers. Day of first flowering was monitored as well as number of fruits, total weight of first class fruit and average fruit weight. In addition, measurement of the soluble solids content (SSC) or ° Brix in a sample of sweet pepper fruits and tomatoes were obtained. No replicates of the treatments were conducted.

First Flowering

Table 13 shows average days from the sowing date to which the first flowering was observed. For sweet peppers and tomatoes, the first flowering occurred about 2-3 days earlier with the use of soil covers (Celliant® and polyester). While not wishing to be bound to any particular theory, the accelerated flowering of sweet peppers and tomatoes are due to the higher fresh and dry weight of the plants observed at the end of propagation period (Example 16).

TABLE 13

Average days to first flowering from sowing date (days)

| Treatments | Sweet Pepper | Tomato | Cucumber |
| --- | --- | --- | --- |
| Celliant ® 400 | 47.6 | 39.5 | 33.7 |
| Celliant ® 600 | 47.5 | 39.9 | 34.4 |
| Polyester | 46.8 | 40.0 | 33.4 |
| No Soil Cover | 49.2 | 42.6 | 33.9 |

Fruit Production

The observation and measurements obtained for sweet peppers are shown in Table 14.

TABLE 14

Average Fruit Production data for Sweet Peppers

| Treatments | Number of fruits (#/m$^2$) | Weight (kg/m$^2$) | Mean fruit weight (g) | % Fruit weight relative to no soil cover | SSC (° Brix) |
| --- | --- | --- | --- | --- | --- |
| Celliant ® 400 | 19.7 | 3.9 | 196 | 99 | 6.3 |
| Celliant ® 600 | 18.1 | 4.1 | 227 | 105 | 6.1 |
| Polyester | 19.7 | 3.9 | 196 | 99 | 6.0 |
| No Soil Cover | 18.1 | 3.9 | 216 | 100 | 6.2 |

The observation and measurements obtained for tomatoes are shown in Table 15. The use of Celliant® 600 increased the average weight of the fruits by 1 kg/m', when compared to the treatment with no soil covers. This is increase represents a production increase of 11%.

TABLE 15

Average Fruit Production data for Tomatoes

| Treatments | Number of fruits (#/m$^2$) | Weight (kg/m$^2$) | Mean fruit weight (g) | % Fruit weight relative to no soil cover | SSC (° Brix) |
| --- | --- | --- | --- | --- | --- |
| Celliant ® 400 | 129.5 | 9.6 | 74 | 100 | 4.3 |
| Celliant ® 600 | 133.5 | 10.7 | 80 | 111 | 4.3 |
| Polyester | 117.0 | 10.2 | 87 | 106 | 4.2 |
| No Soil Cover | 108.5 | 9.6 | 89 | 100 | 4.2 |

The observation and measurements obtained for cucumbers are shown in Table 16.

TABLE 16

Average Fruit Production data for Cucumbers

| Treatments | Number of fruits (#/m$^2$) | Weight (kg/m$^2$) | Mean fruit weight (g) | % Fruit weight relative to no soil cover |
| --- | --- | --- | --- | --- |
| Celliant ® 400 | 44.2 | 17.9 | 405 | 104 |
| Celliant ® 600 | 38.9 | 15.9 | 408 | 93 |
| Polyester | 46.4 | 18.7 | 403 | 109 |
| No Soil Cover | 42.9 | 17.2 | 400 | 100 |

Example 18: Propagation Trials for Fruits and Vegetables with Lamps

One hundred plants each of sweet peppers, tomatoes, and cucumber plants will be planted in identical rockwool blocks (10×10 cm) and will be placed in a climate controlled greenhouse (144 m$^2$). About 25% of each plant species' rockwool blocks will have a soil cover made with the APMs (Trial A). About 25% of each plant species' rockwool blocks will have a soil cover made with the APMs with a different thickness than the ones used in Trial A (Trial B). About 25% of each plant species' rockwool blocks will have soil cover made with the same polymer material used in Trials A and B but not containing the mineral compound, i.e. not an APM (Trial C—control). About 25% of each plant species' rockwool blocks will have no soil covers (Trial D—control). The climate controlled greenhouse will have an ebb-flow system for irrigation and nutrition applications. The greenhouse will be equipped with lamps such as LED lamps or SON-T lamps having intensity of 140 μmol/m$^2$/s. The lamps, either one type or combination of multiple types, will be turned on daily for about 2 hours to about 24 hours. All plants will receive the same treatments (water, nutrients, etc.). The sweet pepper plants will be grown for approximately 10 weeks. The tomato plants will be grown for approximately 8 weeks. The cucumber plants will be grown for approximately 6 weeks. During the study, the plant length, leaf size, number of fruiting bodies, and BRIX values will be monitored and recorded as well as the weights of the rockwool plant blocks. At the end of the propagation study, the plant length, fresh weight plants, dry weight plants, and leaf area will be measured, calculated, and recorded.

Example 19: Soil Cultivation Study with Lettuce and Radish Plants

A climate controlled greenhouse (100 m$^2$) was divided into 6 compartments. Butterhead lettuce plants were planted in 3 of the compartments and radish plants were planted in the other 3 compartments. One compartment of each lettuce and radish will be treated with APMs placed over the soil like mulch (loose fibers), specifically using Celliant® 600 g/sm material ("Celliant® 600" treatment). One compartment of each lettuce and radish will be treated with polyester loose fibers ("polyester" treatment). One compartment of each lettuce and radish will receive no soil covering ("no soil cover" treatment). The cultivation time will be approximately 9 weeks for the lettuce and approximately 5 weeks for the radish plants (from sow date). The plant density of the lettuce was 13 plants/m$^2$ and the sow density of the radish was 230 seeds/m$^2$. This soil cultivation study was conducted with 2 replications per treatment.

The climate controlled greenhouse was equipped with ebb and flood system for irrigation and nutrition applications. All plants and compartments received the same treatments (water, nutrients, etc.). At the end of the study, fresh weight of the plants were measured and those plant parts were dried at 80° C. for two days and measured again (dry weight). The results of the plant measurements were analyzed with analysis of variance (Genstat) and with the Student test for pairwise comparisons of means (p=0.05).

The observation and measurements obtained for butterhead lettuce plants are shown in Table 17. The application of Celliant® mulch or polyester mulch increased the weights of the lettuce and resulted in increased core lengths.

TABLE 17

Average Production Observation and Measurements for Lettuce[1]

| Treatment | Gross weight (g) | Net weight (g) | Waste[2] (g) | Core length (cm) | Dry matter (%) |
|---|---|---|---|---|---|
| Celliant ® 600 | 461 b | 420 b | 42 a | 9 a | 3.3 |
| Polyester | 479 b | 426 b | 53 b | 11 b | 3.3 |
| No Soil Cover | 424 a | 343 a | 81 c | 19 c | 3.4 |
| Significance (p) | 0.001 | <0.001 | <0.001 | <0.001 | NS |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.
[2]Waste refers to organic matter that was discarded which was not suitable for potential sale.

The observation and measurements obtained for radish plants are shown in Table 18. The application polyester mulch the size and weight of the radish tubers. Celliant® mulch resulted in longer leaf lengths.

TABLE 18

Average Production Observation and Measurements for Radish[1]

| Treatment | Tuber diameter (mm) | Tuber weight (g) | Leaf length (cm) | Leaf Weight (g) |
|---|---|---|---|---|
| Celliant ® 600 | 28.6 a | 11.4 a | 22.2 b | 9.1 b |
| Polyester | 30.9 b | 13.6 b | 21.2 a | 8.7 b |
| No Soil Cover | 28.0 a | 9.8 a | 21.0 a | 7.6 a |
| Significance (p) | <0.001 | <0.001 | <0.001 | <0.001 |

[1]When values in the same column followed by the same letter, treatments do not differ significantly at p = 0.05. When p = 0.05 or p < 0.05, treatments have a significant effect on that aspect. Treatments with a different letter are significantly different.
NS = statistically not significant.

Example 20: Cultivation Study with Strawberry

Approximately 100 pots of strawberry plants will be placed in a climate controlled greenhouse (100 m$^2$). The identical pots contain coconut chips as substrate. About 50% of the pots will receive APMs over the growth media (Trial A) and about 50% of the pots will not (Trial B—control). The cultivation time will be approximately 10 weeks. The climate controlled greenhouse will have an ebb-flow system for irrigation and nutrition applications. The greenhouse will be equipped with lamps such as LED lamps or SON-T lamps having intensity of 140 μmol/m$^2$/s. The lamps, either one type or combination of multiple types, will be turned on daily for about 0 hours to about 24 hours. All plants and compartments will receive the same treatments (water, nutrients, etc.). During the study, the plant height, width, number of fruits, weight of the fruits, and BRIX values will be monitored and recorded. At the end of the cultivation study, fresh weight, and the dry weight of the plants will be measured and recorded.

It should be understood that the above description is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world.

What is claimed is:

1. A kit, comprising: a plant, a pot, and an active polymer disposed within the pot as a liner of the pot, wherein said active polymer comprises one or more minerals incorporated in a polymer matrix, and wherein an infrared radiation absorptance exhibited by said active polymer is at least 78% greater than an infrared radiation absorptance exhibited by a control material that does not include the active polymer, provided the same source of a radiation.

2. The kit of claim 1, wherein the active polymer is in the form of a bag, the bag configured to receive the plant therewithin.

3. A kit, comprising: a plant growth media, a pot, and an active polymer disposed within the pot as a liner of the pot, wherein said active polymer comprises one or more minerals incorporated in a polymer matrix, and wherein an infrared radiation absorptance exhibited by said active polymer is at least 78% greater than an infrared radiation absorptance exhibited by a control material that does not include the active polymer, provided the same source of a radiation.

4. The kit of claim 3, wherein the one or more minerals are selected from silicon carbide (SiC), calcium carbide ($CaC_2$), titanium dioxide ($TiO_2$), aluminum oxide ($Al_2O_3$), and silicon dioxide ($SiO_2$).

5. The kit of claim 3, wherein the active polymer comprises one or more polymer types selected from polyethylene terephthalate (PET), polyester, nylon, rayon, and spandex.

6. The kit of claim 3, wherein the one or more minerals incorporated in the polymer matrix comprises about 1% to about 2% of a total weight of the active polymer.

7. The kit of claim 3, wherein the active polymer is at least one of a fiber, a staple fiber, a film, a sheet, and/or a non-woven textile.

8. The kit of claim 3, wherein the active polymer is in the form of a bag, the bag configured to receive the plant growth media therewithin.

9. An agricultural material, comprising: a bag comprising an active polymer, the active polymer including one or more minerals incorporated in a polymer matrix, and wherein an infrared radiation absorptance exhibited by said active polymer is at least 78% greater than an infrared radiation absorptance exhibited by a control material that does not include the active polymer, provided the same source of a radiation,
wherein the bag covers a growth media.

10. The agricultural material of claim 9, wherein the one or more minerals are selected from silicon carbide (SiC), calcium carbide ($CaC_2$), titanium dioxide ($TiO_2$), aluminum oxide ($Al_2O_3$), and silicon dioxide ($SiO_2$).

11. The agricultural material of claim 9, wherein the active polymer comprises one or more polymer types selected from polyethylene terephthalate (PET), polyester, nylon, rayon, and spandex.

12. The agricultural material of claim 9, wherein the one or more minerals incorporated in the polymer matrix comprises about 1% to about 2% of a total weight of the active polymer.

13. The agricultural material of claim 9, wherein the active polymer is at least one of a fiber, a staple fiber, a film, a non-woven textile, and/or a sheet.

* * * * *